US 12,545,434 B1

United States Patent
Schickling et al.

(10) Patent No.: US 12,545,434 B1
(45) Date of Patent: Feb. 10, 2026

(54) SYSTEMS AND METHODS FOR AUTONOMOUS AIRCRAFT CAPTURING, LIFTING, AND PUSHBACK

(71) Applicant: TowFLEXX MilTech, Inc., New Castle, DE (US)

(72) Inventors: Axel Schickling, Visbek (DE); Tobias Strobl, Las Vegas, NV (US)

(73) Assignee: TowFLEXX MilTech, Inc., New Castle, DE (US)

( * ) Notice: Subject to any disclaimer, the term of this patent is extended or adjusted under 35 U.S.C. 154(b) by 0 days.

(21) Appl. No.: 19/072,829

(22) Filed: Mar. 6, 2025

Related U.S. Application Data

(63) Continuation of application No. 18/920,075, filed on Oct. 18, 2024, now Pat. No. 12,269,612.

(51) Int. Cl.
| | |
|---|---|
| *B64F 1/228* | (2024.01) |
| *G05D 1/437* | (2024.01) |
| *B64F 1/02* | (2006.01) |
| *B64F 1/24* | (2006.01) |

(52) U.S. Cl.
CPC ............... *B64F 1/228* (2013.01); *B64F 1/02* (2013.01); *B64F 1/24* (2013.01); *G05D 1/437* (2024.01)

(58) Field of Classification Search
CPC . B64F 1/225; B64F 1/228; B64F 1/24; B64D 45/06; G05D 1/437
See application file for complete search history.

(56) References Cited

U.S. PATENT DOCUMENTS

| | | | | |
|---|---|---|---|---|
| 5,078,340 | A * | 1/1992 | Anderberg | B64F 1/22 244/50 |
| 6,305,484 | B1 * | 10/2001 | Leblanc | B64F 1/22 180/167 |
| 9,199,745 | B2 * | 12/2015 | Braier | B64F 1/227 |
| 9,394,059 | B2 * | 7/2016 | Cox | G01S 13/93 |
| 11,858,659 | B2 * | 1/2024 | Vana | B64D 43/00 |
| 12,269,612 | B1 * | 4/2025 | Schickling | G05D 1/672 |
| 2019/0202579 | A1 * | 7/2019 | Costello | B60L 53/32 |
| 2021/0130008 | A1 * | 5/2021 | Schickling | G05D 1/024 |
| 2021/0362878 | A1 * | 11/2021 | Vana | G08G 5/727 |

FOREIGN PATENT DOCUMENTS

CN 117842368 A * 4/2024 ............ B60L 50/60

\* cited by examiner

*Primary Examiner* — Brian M O'Hara
(74) *Attorney, Agent, or Firm* — Scale LLP

(57) ABSTRACT

An aircraft tow vehicle comprises a turntable lifting unit configured to automatically rotate and lift for attachment to a nose landing gear of an aircraft. A gate coupled to the turntable lifting unit automatically unlocks, opens to receive the nose landing gear, closes to secure the nose landing gear, and locks. A sensor system detects the nose landing gear. A controller receives data from the sensor system, processes the data to determine a position of the nose landing gear, and controls the turntable lifting unit while automatically adjusting a position of the tow vehicle relative to the nose landing gear. A moving floor adjusts to accommodate different nose wheel sizes. A nose wheel adapter automatically positions itself to hold down the nose landing gear when weight is detected on the moving floor.

18 Claims, 12 Drawing Sheets

SYSTEMS AND METHODS FOR AUTONOMOUS AIRCRAFT CAPTURING, LIFTING, AND PUSHBACK

CROSS-REFERENCE TO RELATED APPLICATIONS

This application is a continuation of U.S. application Ser. No. 18/920,075, titled "Systems and Methods for Autonomous Aircraft Capturing, Lifting, and Pushback," filed Oct. 18, 2024, which is hereby incorporated by reference in its entirety.

FIELD OF INVENTION

The present disclosure relates to aircraft ground handling systems, and more particularly to an autonomous system for capturing, lifting, and pushing back aircraft using a tow vehicle with an integrated turntable and sensor array.

BACKGROUND

Aircraft ground handling operations, including towing, pushback, and repositioning, are critical tasks performed at airports and on aircraft carriers. These operations require precise control and maneuvering of aircraft in confined spaces to ensure safety and efficiency. Conventional towing methods often involve the use of towbars, which can be cumbersome to connect and disconnect, and may place stress on the aircraft's landing gear during turns.

Towing vehicles for aircraft have evolved to include towbarless designs that directly engage the nose landing gear. These vehicles typically have a rotating platform or turntable to allow the aircraft to be turned while towing. However, existing systems may still face challenges in maintaining proper alignment between the tow vehicle and the aircraft, particularly during tight maneuvers or in adverse weather conditions.

The increasing size and complexity of modern aircraft, combined with the need for more efficient ground operations, has created a demand for more advanced and autonomous towing solutions. There is a particular need for systems that can reduce the risk of damage to aircraft, improve operational efficiency, and minimize the personnel required for ground handling tasks.

Additionally, as airports and aircraft carriers become more congested, there is a growing need for tow vehicles that can operate in tighter spaces and perform more precise maneuvers. This includes the ability to reposition aircraft quickly and safely in hangars, on flight decks, and in other confined areas where traditional towing methods may be impractical or inefficient.

Furthermore, the aviation industry is increasingly focused on reducing emissions and improving sustainability in all aspects of operations, including ground handling. This has led to interest in electric and hybrid tow vehicles that can operate with lower environmental impact while still meeting the demanding requirements of aircraft towing and pushback operations.

Conventional aircraft towing vehicles powered by gasoline or diesel engines often suffer from poor fuel efficiency and high operating costs. The complex mechanical systems in these engines require frequent maintenance, including oil changes, filter replacements, and component repairs, leading to increased downtime and expenses. Furthermore, the combustion of fossil fuels produces substantial amounts of harmful emissions, contributing to air quality degradation in airport environments.

Electric propulsion systems have emerged as a promising alternative for aircraft towing vehicles. However, the implementation of electric systems in this application presents unique challenges. Aircraft towing requires high torque and power output, particularly during initial movement and when overcoming the inertia of large aircraft. This demand for high current can strain conventional battery systems and limit operational capabilities.

Additionally, the operational requirements of airports necessitate minimal downtime for charging or maintenance. Towing vehicles must be available for extended periods to support continuous airport operations, which can be challenging for electric vehicles with limited battery capacity or long charging times.

The development of advanced battery management systems is critical to addressing these challenges. Such systems must be capable of delivering high currents for breakaway torque while maintaining efficiency and longevity. Furthermore, they should offer flexibility in terms of capacity and power output to accommodate various aircraft sizes and operational needs.

As the aviation industry continues to evolve, there is an increasing demand for innovative solutions that can enhance the efficiency, sustainability, and reliability of ground support equipment. Improved battery management systems for aircraft towing vehicles have the potential to significantly impact airport operations, reducing costs, minimizing environmental impact, and improving overall operational efficiency.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

According to an aspect of the present disclosure, a tow vehicle configured to automatically perform aircraft towing operations is provided. The tow vehicle can include a turntable lifting unit configured to automatically rotate and lift for attachment to a nose landing gear of an aircraft. The tow vehicle can include a gate coupled to the turntable lifting unit, the gate configured to automatically unlock, open to receive the nose landing gear, close to secure the nose landing gear, and lock. The tow vehicle can include a sensor system comprising one or more sensors configured to detect the nose landing gear. The tow vehicle can include a controller configured to receive data from the sensor system, process the data to determine a position of the nose landing gear, and control the turntable lifting unit while automatically adjusting a position of the tow vehicle relative to the nose landing gear. The tow vehicle can include a moving floor coupled to the turntable lifting unit, the moving floor configured to automatically adjust to accommodate different nose wheel sizes. The tow vehicle can include a nose wheel adapter configured to automatically position itself to hold down the nose landing gear when weight is detected on the moving floor.

According to other aspects of the present disclosure, the tow vehicle may include one or more of the following features. The sensor system may comprise at least one of a camera sensor, an ultrasonic sensor, a radar sensor, or a laser sensor. The controller may be further configured to automatically control the turntable lifting unit to maintain the nose landing gear in a straight position relative to a roll axis of the aircraft during towing. The turntable lifting unit may be configured as an electro-mechanical system without hydraulics. The controller may be further configured to detect line markings, objects, and/or symbols and control the tow vehicle in response. The controller may be further configured to process the data to detect a pushback line, process the data to determine a position of the nose landing gear relative to the pushback line, and control the turntable lifting unit while automatically adjusting a position of the tow vehicle relative to the nose landing gear during a pushback operation to maintain alignment of the aircraft with the pushback line. The sensor system may be further configured to detect an intersection of the pushback line with another line indicating a turn, receive input indicating a turn direction, and automatically rotate the aircraft in place based on the detected intersection and the indicated turn direction. The controller may be further configured to automatically release the aircraft from the tow vehicle upon completion of the pushback operation. The tow vehicle may comprise two individual drive units, each containing a redundant drive system. The controller may be further configured to interface with a digital twin of an operating environment of the tow vehicle, and wherein the controller may be configured to use information from the digital twin to assist in navigation and decision-making during towing operations.

According to another aspect of the present disclosure, a method for automatically towing an aircraft is provided. The method can include detecting, by a sensor system of an aircraft tow vehicle, a nose landing gear of an aircraft. The method can include processing, by a controller of the aircraft tow vehicle, data from the sensor system to determine a position of the nose landing gear. The method can include controlling, by the controller, a turntable lifting unit of the aircraft tow vehicle while automatically adjusting a position of the aircraft tow vehicle relative to the nose landing gear. The method can include unlocking and opening a gate coupled to the turntable lifting unit. The method can include surrounding the nose landing gear with the turntable lifting unit. The method can include closing and locking the gate to secure the nose landing gear. The method can include adjusting a moving floor coupled to the turntable lifting unit to accommodate a size of the nose landing gear. The method can include lifting the nose landing gear. The method can include clamping the nose landing gear. The method can include rotating the tow vehicle in place without turning the nose landing gear.

According to other aspects of the present disclosure, the method may include one or more of the following features. The sensor system may comprise at least one of a camera sensor, an ultrasonic sensor, a radar sensor, or a laser sensor. The method may further comprise maintaining the nose landing gear in a straight position relative to a roll axis of the aircraft during towing. The method may further comprise detecting, line markings, objects, and/or symbols, and automatically controlling the aircraft tow vehicle in response to the detected line markings, objects, and/or symbols. The method may further comprise automatically positioning a nose wheel adapter to hold down the nose landing gear when weight is detected on the moving floor. The method may further comprise detecting a pushback line, aligning the aircraft with the pushback line, automatically adjusting the position of the aircraft tow vehicle during a pushback operation to maintain alignment of the aircraft with the pushback line, detecting an intersection of the pushback line with another line indicating a turn, receiving input indicating a turn direction, and automatically rotating the aircraft in place based on the detected intersection and the indicated turn direction. The method may further comprise automatically releasing the aircraft from the aircraft tow vehicle upon completion of the pushback operation. The method may further comprise interfacing, by the controller, with a digital twin of an operating environment of the aircraft tow vehicle, and using information from the digital twin to assist in navigation and decision-making during towing operations. The method may be performed entirely autonomously by the aircraft tow vehicle without human intervention, including autonomously navigating to the aircraft, performing a towing operation, and returning to a designated location after completion of the towing operation. The method may further comprise detecting, by the sensor system, human gestures, processing, by the controller, the detected human gestures to determine corresponding instructions, and automatically controlling the aircraft tow vehicle in response to the determined instructions.

The foregoing general description of the illustrative embodiments and the following detailed description thereof are merely exemplary aspects of the teachings of this disclosure and are not restrictive.

BRIEF DESCRIPTION OF FIGURES

Non-limiting and non-exhaustive examples are described with reference to the following figures.

DETAILED DESCRIPTION

The following description sets forth exemplary aspects of the present disclosure. It should be recognized, however, that such description is not intended as a limitation on the scope of the present disclosure. Rather, the description also encompasses combinations and modifications to those exemplary aspects described herein.

The present disclosure provides an autonomous system for capturing, lifting, and pushing back aircraft using a tow vehicle equipped with an integrated turntable lifting unit, sensor fusion system, and controller. This system is designed to enhance the efficiency and precision of aircraft ground handling operations, reducing the risk of damage to aircraft and minimizing the need for manual labor.

The automated 360° turntable lifting unit is a key component of the system, designed to rotate and lift for attachment to a wide range of single and double nose-wheel aircraft configurations. This unit allows the tow vehicle to attach to the aircraft's nose landing gear (NLG) directly from any side of the aircraft, eliminating the need for an exit route and increasing the utilization of space.

The sensor fusion system, integrated with the turntable lifting unit, comprises multiple sensor technologies, such as high-resolution camera sensors, ultrasonic sensors, radar sensors, and laser sensors. These sensors work in unison to detect the NLG and guide the tow vehicle during operations. In some embodiments, the sensor fusion system can also detect pushback lines and other markings on the ground or tarmac, human gestures, environmental conditions, and obstacles, facilitating autonomous pushback operations.

The controller processes data from the sensor fusion system and controls the turntable lifting unit to automatically adjust the position of the tow vehicle relative to the NLG. In some embodiments, the controller includes an artificial intelligence/machine learning component trained on real-world conditions to facilitate autonomous decision-making during pushback operations.

Together, these components form a comprehensive system for autonomous aircraft capturing, lifting, and pushback, offering significant improvements over conventional aircraft ground handling methods.

Figure 1A:
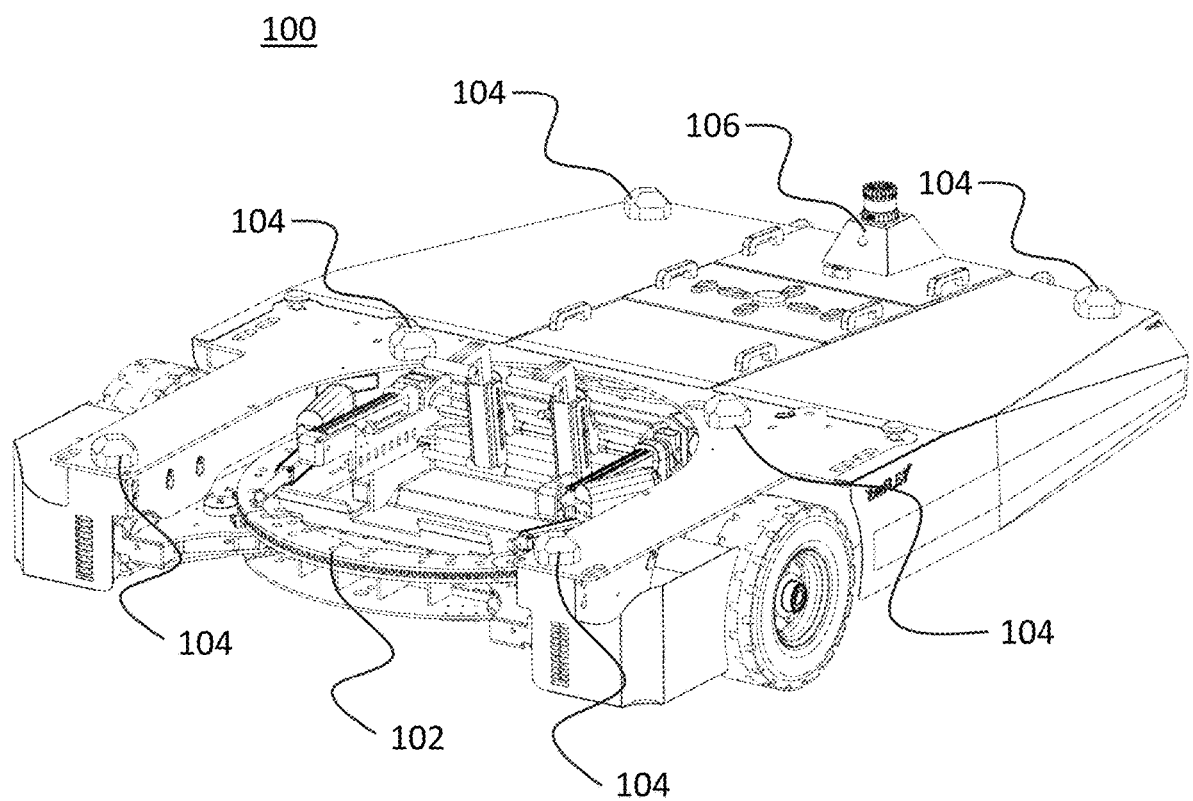
FIG. 1A illustrates a perspective view of a tow vehicle, according to aspects of the present disclosure.

Referring to FIG. 1A, the tow vehicle 100 is depicted in a perspective view. The tow vehicle 100 has a main body with a generally rectangular shape and rounded corners. This design may provide stability and maneuverability during operations. The body of the tow vehicle 100 includes a central opening or cavity in its upper surface. This cavity may house internal mechanisms or components, such as the turntable lifting unit, sensor system, and controller, which contribute to the functionality of the tow vehicle 100.

The tow vehicle 100 incorporates multiple sensors 104 and sensors 106 positioned at various points around its body. In some aspects, these sensors 104 and 106 may be used for environmental awareness and navigation. For example, sensors 104 may be used to sense and monitor the NLG, the positioning of the tow vehicle 100 relative to the aircraft, and/or the presence of obstacles or hazards around the aircraft. In some cases, sensors 106 may be used to detect pushback lines and other markings on the ground or tarmac, human gestures, environmental conditions, and/or obstacles, such as other aircraft, to facilitate autonomous pushback operations.

In some aspects, the tow vehicle 100 may be manually controlled by a human operator through wired or wireless means, allowing for direct control of its movements and functions. This manual control mode may be useful in situations that require human judgment or in environments where autonomous operation is not feasible or desired.

In other embodiments, the tow vehicle 100 may operate in a semi-autonomous mode. In this mode, the system may require only minimal input from a human operator to initiate operations and provide high-level instructions. For example, an operator may input a destination or a specific task, and the tow vehicle 100 may then autonomously execute the necessary movements and actions to complete the task, while still allowing for human oversight and intervention if needed.

In still other embodiments, the tow vehicle 100 may be capable of fully autonomous operation. In this mode, the vehicle may perform complex aircraft handling tasks, including capturing, lifting, and pushing back aircraft, without direct human control. The autonomous mode may utilize the sensor fusion system, controller, and other integrated components to navigate the airport environment, make decisions, and execute operations based on pre-programmed algorithms and real-time data analysis.

Figure 1B:
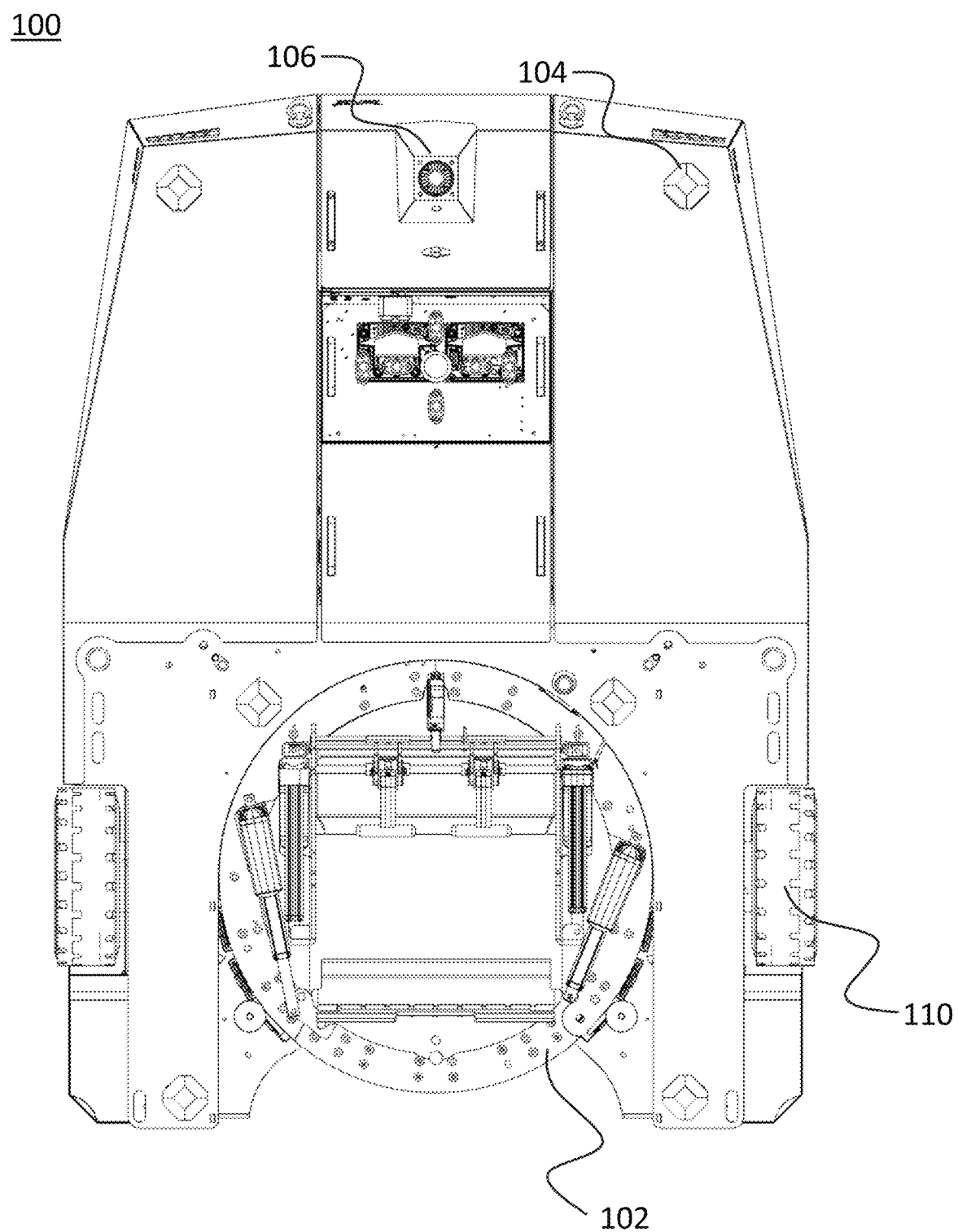
FIG. 1B illustrates a top view of the tow vehicle of FIG. 1A.

Referring to FIG. 1B, the tow vehicle 100 is depicted in a top view, providing a clear view of the sensor system. The sensor system comprises multiple sensors 104 and sensors 106, which may be strategically positioned around the tow vehicle 100. This positioning may allow for comprehensive environmental awareness and navigation during operations. The sensor system of the tow vehicle 100 can be configured to detect a type of aircraft and/or the nose landing gear (NLG) of an aircraft. This detection capability supports the autonomous capturing and lifting process, as it enables the tow vehicle 100 to accurately locate and secure the NLG.

The sensor system comprises at least one of a camera sensor, an ultrasonic sensor, a radar sensor, or a laser sensor. These different types of sensors may work in unison to provide a comprehensive sensing capability. For example, camera sensors may capture high-resolution images of the aircraft, its NLG, and the surrounding environment, while ultrasonic sensors may measure the distance between the tow vehicle 100 and the NLG. Radar sensors may detect the presence of obstacles or hazards around the aircraft, and laser sensors may provide precise measurements of the NLG dimensions. In some embodiments, the sensor system may include additional sensors or different types of sensors, depending on the specific requirements of the aircraft capturing and lifting process.

The data collected by the sensor system is processed by a controller of the tow vehicle 100. The controller determines the position of the aircraft and its NLG based on the sensor data and controls the turntable lifting unit to automatically adjust the position of the tow vehicle 100 relative to the NLG. This autonomous adjustment capability allows the tow vehicle 100 to accurately align with the NLG, facilitating the capturing and lifting process.

In some aspects, the controller of the tow vehicle may be embodied as a combination of hardware and software components integrated within the tow vehicle's systems. The controller may include a central processing unit (CPU) or microprocessor, memory modules, and various input/output interfaces. The software component may comprise firmware, operating systems, and application-specific programs designed to process sensor data, make decisions, and control the tow vehicle's operations.

The controller may be connected to the Controller Area Network (CAN) bus system of the tow vehicle. This connection may allow the controller to communicate with and control various components of the tow vehicle, including the turntable lifting unit, drive systems, and sensor arrays. The CAN bus may facilitate real-time data exchange between different modules of the tow vehicle, enabling coordinated and efficient operation of all systems.

In some implementations, the controller may interface with one or more additional communication devices to enhance its connectivity and functionality. These communication devices may include wireless modules supporting various protocols such as Wi-Fi, cellular networks, or radio frequency (RF) communication. For example, a Wi-Fi module may allow the controller to connect to local networks at airports or maintenance facilities, potentially enabling remote monitoring and control of the tow vehicle. A cellular modem may provide wide-area network connectivity, allowing the controller to receive updates, transmit operational data, or communicate with remote operators over long distances. RF communication modules may enable short-range, low-latency communication with other ground support equipment or control towers.

The integration of these wireless communication capabilities may allow the controller to receive real-time instructions, update its operational parameters, or transmit status information to remote monitoring systems. In some cases, this may enable remote operation or supervision of the tow vehicle, enhancing its flexibility and utility in various airport environments.

In some embodiments, sensors 106 may be configured as 360-degree sensors, providing a complete view of the surrounding environment. This capability may be particularly useful during pushback operations, where the tow vehicle 100 needs to navigate through complex airport environments. The 360-degree sensors may detect pushback lines, other markings on the ground or tarmac, human gestures, environmental conditions, and obstacles, such as other aircraft.

In some implementations, the 360-degree sensors may utilize Light Detection and Ranging (LiDAR) technology. A LiDAR sensor may emit laser pulses in a 360-degree horizontal plane around the tow vehicle, measuring the time it takes for the pulses to reflect off surrounding objects and return to the sensor. This may allow the sensor to create a detailed 3D map of the environment in real-time.

The LiDAR sensor may be mounted on top of the tow vehicle, potentially providing an unobstructed view of the surroundings. It may rotate rapidly, sending out thousands of laser pulses per second to build a comprehensive point cloud of the area. This point cloud data may be processed by the controller to identify objects, determine their distance and position relative to the tow vehicle, and detect potential obstacles or hazards.

In some aspects, the 360-degree LiDAR sensor may work in conjunction with other sensor types to enhance the overall sensing capabilities of the tow vehicle. For example, the LiDAR data may be fused with information from cameras or radar sensors to provide a more robust and accurate representation of the environment. This sensor fusion approach may help overcome limitations of individual sensor types, such as the ability to detect objects in low-light conditions or distinguish between different types of ground markings.

The 360-degree sensor may also incorporate advanced filtering algorithms to differentiate between static and moving objects in the environment. This capability may be particularly useful in busy airport settings, where the tow vehicle needs to navigate around both stationary obstacles and moving vehicles or personnel.

In some implementations, the sensor fusion system may connect to, communicate with, or otherwise integrate with external sensor systems at the airport or on the aircraft carrier. These external sensor systems may include camera systems, LiDAR sensors, GPS tracking systems, or other systems for monitoring the position and movement of objects in the surrounding environment. The sensor fusion system may leverage information gleaned from these other systems and/or coordinate with them directly for obstacle avoidance, safety compliance, autonomous decision making, operations management, and the like.

External sensor systems may be implemented at fixed locations such as on towers, buildings, or runways. For example, high-resolution cameras mounted on airport terminals may provide a wide-angle view of the tarmac, allowing for real-time tracking of multiple aircraft and ground vehicles simultaneously. LiDAR sensors installed along taxiways may create detailed 3D maps of the area, helping to identify potential obstacles or changes in the environment.

In some aspects, external sensor systems may also be implemented on mobile platforms. Tow vehicles 100 equipped with the sensor fusion system may maintain constant communication with each other and/or one or more support vehicles. These support vehicles may take the form of autonomous or semi-autonomous ground vehicles as well as aircraft like drones.

The ground vehicles or drones may be configured to dock with the tow vehicle 100, and, when needed, separate from the tow vehicle 100 to provide additional monitoring capabilities. These capabilities may be especially advantageous during autonomous pushback operations where the aircraft itself creates certain blind spots for the sensors on the tow vehicle 100. The support vehicles may be configured to cover these blind spots as well as provide an additional layer of visibility to other vehicles and personnel in the vicinity.

In some implementations, support vehicles may be equipped with flashing lights or other visual indicators to enhance their visibility. This feature may help alert other ground personnel or vehicles to the presence of the tow vehicle 100 and its one or more support units, thereby improving overall safety in busy airport environments.

The integration of external sensor systems with the tow vehicle's sensor fusion system may allow for a more comprehensive and accurate understanding of the operational environment. For instance, data from fixed cameras on airport buildings may be combined with real-time information from the tow vehicle's onboard sensors and mobile support units to create a multi-layered, dynamic representation of the surroundings. This enhanced situational awareness may enable more efficient and safer autonomous operations.

In some cases, the communication between the tow vehicle and external sensor systems may be facilitated through a centralized control system. This system may act as a hub, collecting and processing data from various sources and distributing relevant information to individual tow vehicles as needed. Such a setup may allow for coordinated movements of multiple tow vehicles and support units, optimizing traffic flow and reducing the risk of conflicts or collisions.

The integration with external sensor systems may also enhance the tow vehicle's ability to adapt to changing environmental conditions. For example, in low visibility situations such as fog or heavy rain, the tow vehicle may rely more heavily on data from fixed LiDAR sensors or radar systems to supplement its own sensor capabilities. This adaptability may allow for continued safe operation in a wider range of weather conditions.

Continuing with the description of FIG. 1B, the tow vehicle 100 includes a turntable lifting unit (TLU) 102 positioned centrally within its body. In some aspects, the TLU 102 is configured to automatically rotate and lift for attachment to a wide range of single and double nose-wheel aircraft configurations. This allows the tow vehicle 100 to attach to the aircraft's NLG directly from any side of the aircraft, eliminating the need for an exit route and increasing the utilization of space. The TLU 102 is described in more detail with respect to TLU 200 in FIGS. 2A, 2B, and 2C.

The tow vehicle 100 may also include a visual line guidance and object recognition system. This system may be configured to detect line markings, objects, or symbols and control the tow vehicle 100 in response. For example, the visual line guidance and object recognition system may detect pushback lines on the ground or tarmac, facilitating autonomous pushback operations. In some cases, the visual line guidance and object recognition system may also detect human gestures, such as hand signals, and control the tow vehicle 100 accordingly.

Figure 1C:
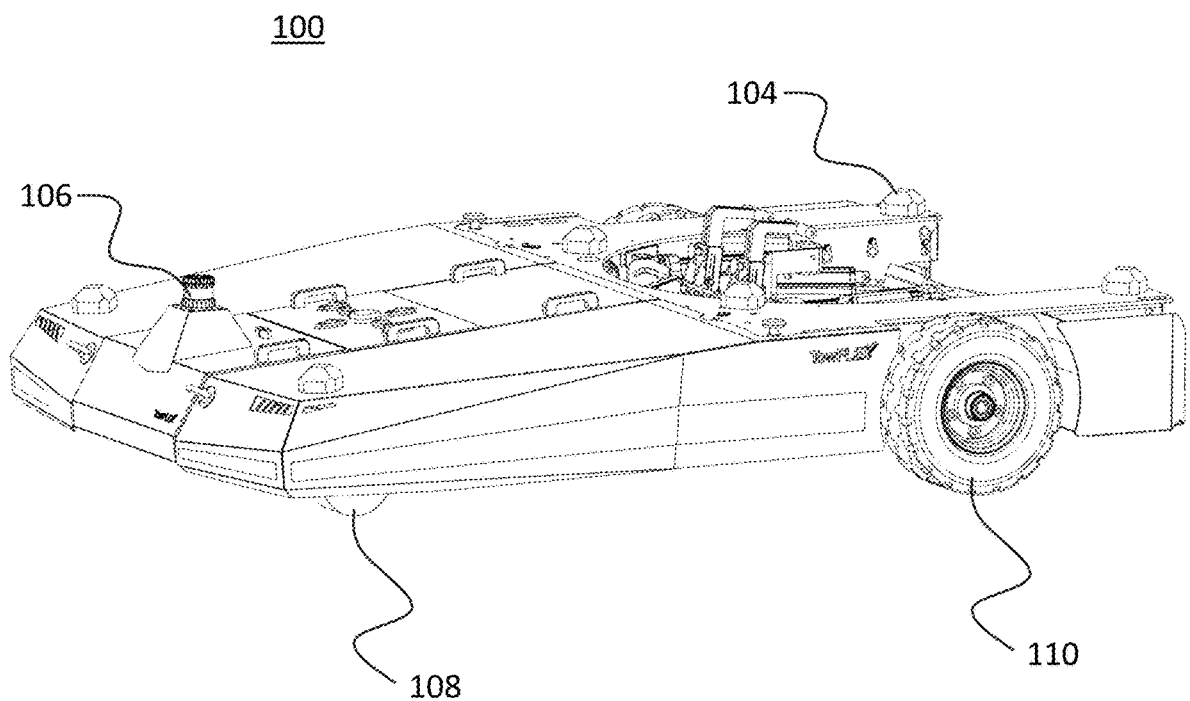
FIG. 1C illustrates a side view of the tow vehicle of FIG. 1A.

Referring to FIG. 1C, the tow vehicle 100 is depicted in a side view, providing a clear view of its overall shape and key components. The tow vehicle 100 has a low-profile, elongated body with a tapered front end and a more elevated rear section. The tow vehicle 100 may be configured with two types of wheels for movement. Caster wheels 108 provide maneuverability for steering. The caster wheels 108 may rotate freely in multiple directions, similar to wheels on a shopping cart, allowing for enhanced maneuverability of the tow vehicle 100. In some aspects, these caster wheels 108 may be equipped with a magnetic brake system that operates in the direction of rotation, which corresponds to the direction of vehicle travel.

The magnetic brake system may include electromagnetic components that, when activated, generate a magnetic field to apply braking force to the caster wheels 108. This braking mechanism may be particularly useful in emergency stop situations. In the event that an emergency stop is initiated, the magnetic brakes on the caster wheels 108 may activate to prevent the tow vehicle 100 from turning sideways too quickly if one side of the drive wheels 110 starts to slip.

By applying braking force in the direction of rotation, the magnetic brake system may help maintain the stability and control of the tow vehicle 100 during rapid deceleration. This feature may enhance the safety of the towing operation by reducing the risk of the tow vehicle 100 skidding or jackknifing during emergency stops or on slippery surfaces. The controller of the tow vehicle 100 may be configured to activate the magnetic brakes on the caster wheels 108 in coordination with the braking of the drive wheels 110. This coordinated braking approach may help ensure a more controlled and stable stop, even in challenging conditions or emergency situations.

Drive wheels 110 can be a part of a drive wheel system and may serve as the main propulsion and steering mechanism for tow vehicle 100. The drive wheel system of the tow vehicle 100 may incorporate two individual drive units, each containing a redundant drive system with twin electrical high-torque rotary drive hub gear motors. These drive units may be positioned on opposite sides of the vehicle, with each unit controlling one of the drive wheels 110. This configuration may allow for independent control of each side of the tow vehicle 100, enabling precise maneuvering and rotation capabilities.

In some aspects, the drive wheel system may be designed to allow the two drive units of the tow vehicle 100 to operate independently. This independent operation may be achieved by controlling the rotation direction and speed of each drive wheel 110 separately. For example, to rotate the tow vehicle 100 in place, the controller may command one drive wheel 110 to rotate in a forward direction while simultaneously commanding the opposite drive wheel 110 to rotate in a reverse direction. This opposing rotation of the drive wheels 110 may create a pivoting effect, allowing the tow vehicle 100 to turn on its central axis without forward or backward movement.

The ability to rotate in place may be particularly advantageous in confined spaces such as crowded airport aprons or narrow hangars. This feature may allow the tow vehicle 100 to maneuver efficiently around obstacles and position itself precisely relative to aircraft, potentially improving the overall efficiency of ground handling operations.

In some implementations, the drive wheel system may include variable speed control for each drive wheel 110. This variable speed control may allow for more nuanced movements, such as gradual turns or slight adjustments in position. The controller may adjust the speed of each drive wheel 110 independently based on input from the sensor system, potentially enabling smooth and precise movements during aircraft capturing, lifting, and pushback operations.

The drive wheel system may also incorporate advanced traction control features. In some cases, the controller may monitor the rotation speed of each drive wheel 110 and adjust power delivery to prevent wheel slip. This traction control capability may be particularly useful when operating on wet or slippery surfaces, potentially enhancing the safety and reliability of the tow vehicle 100 in various weather conditions.

In some aspects, the tow vehicle 100 may be configured with two or more drive wheels 110 on each side to enhance traction, stability, and load-bearing capacity. This configuration may distribute the weight of the tow vehicle 100 and the aircraft more evenly across multiple points of contact with the ground.

The multiple drive wheels 110 on each side may be arranged in a tandem configuration, where they are aligned one behind the other. This arrangement may allow the tow vehicle 100 to maintain a relatively narrow profile while still benefiting from increased traction and load distribution. In some implementations, the drive wheels 110 may be mounted on independent suspension systems, enabling them to adapt to uneven surfaces and maintain consistent ground contact.

Each of the drive wheels 110 in this multi-wheel configuration may be powered by its own electric motor, potentially allowing for even more precise control over the tow vehicle's movement. The controller of the tow vehicle 100 may be programmed to coordinate the operation of these multiple drive wheels 110, adjusting the power output to each wheel based on factors such as the weight distribution of the aircraft, the surface conditions, and the desired maneuver.

In some cases, the use of multiple drive wheels 110 on each side may enable the tow vehicle 100 to handle heavier aircraft or operate in more challenging environmental conditions. For example, this configuration may provide better traction on wet or icy surfaces, or when moving aircraft on inclined surfaces such as those found on some aircraft carriers.

The multi-wheel design may also contribute to the redundancy and reliability of the tow vehicle 100. If one drive wheel 110 or its associated motor were to malfunction, the remaining wheels could potentially continue to provide sufficient propulsion and control to complete the aircraft handling operation or move the tow vehicle 100 to a safe location for maintenance.

Figure 2A:
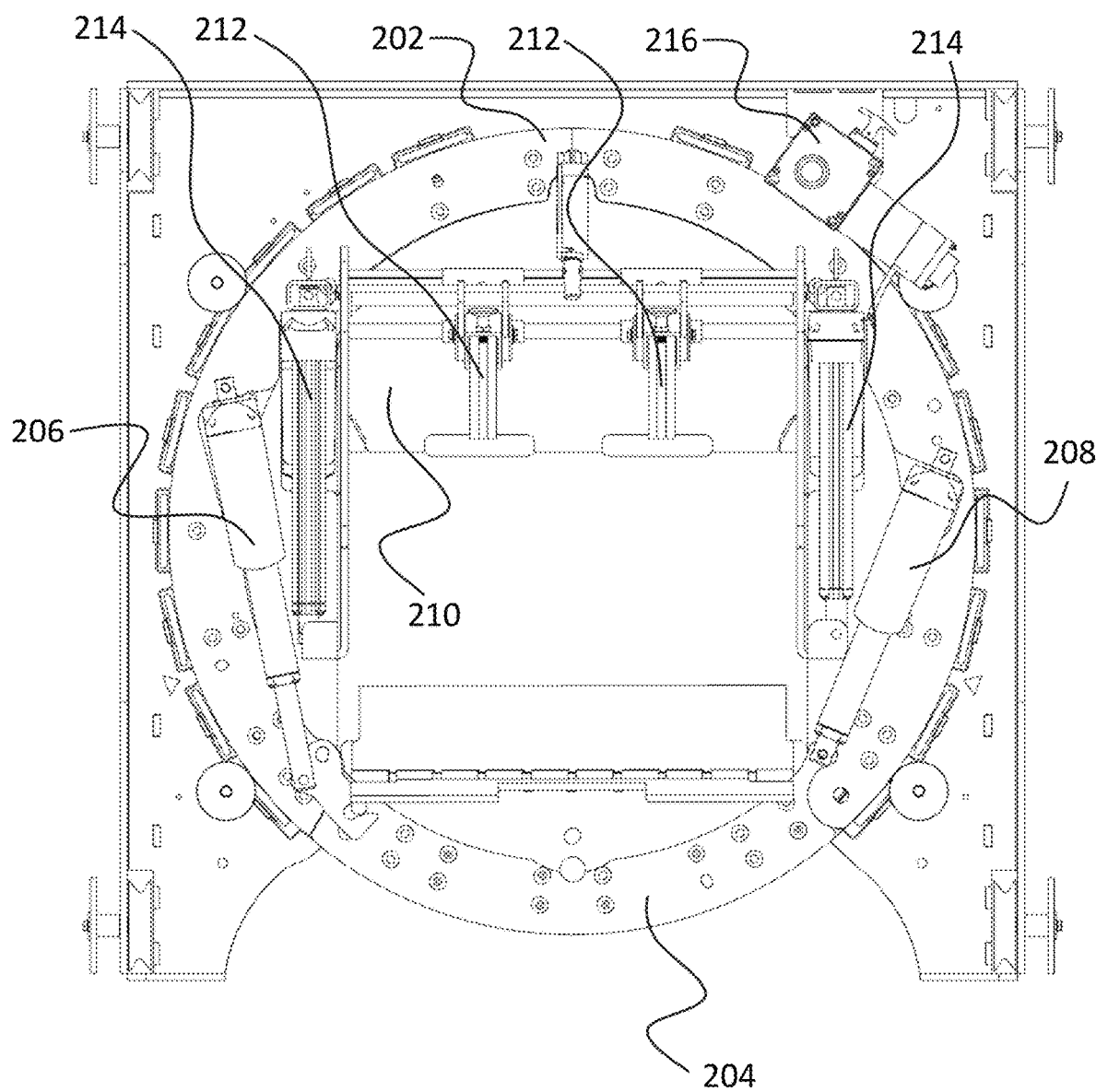
FIG. 2A illustrates a top view of a turntable lifting unit, according to aspects of the present disclosure.

Referring to FIG. 2A, the turntable lifting unit (TLU) 200 is depicted in a top view, providing a clear view of its key components and their functions in capturing, securing, and manipulating the aircraft's NLG. The TLU 200 may be integrated into various configurations to accommodate different operational needs and environments. While the TLU 200 is shown as part of the tow vehicle 100 in FIG. 1A, FIG. 1B, and FIG. 1C, it may also be implemented in other forms.

In some aspects, the TLU 200 may be designed as standalone equipment. This configuration may allow for greater flexibility in deployment and use across different airport or carrier environments. As a standalone unit, the TLU 200 may be equipped with its own power source, sensor system, control systems (including, for example, the controller described above), and mobility features, enabling it to operate independently of a larger vehicle.

In other implementations, the TLU 200 may be combined with or attached to a towbar. This configuration may provide a hybrid solution that leverages the traditional towbar approach while incorporating the advanced capturing and lifting capabilities of the TLU 200. The towbar-TLU combination may offer enhanced maneuverability and precision in aircraft handling, particularly in situations where a full tow vehicle is not required or practical.

Additionally, the TLU 200 may be combined with or attached to different types of vehicles or trailers. This versatility allows for integration with existing ground support equipment or specialized vehicles used in various aviation contexts. For example, the TLU 200 may be mounted on a compact electric vehicle for use in tight hangar spaces, or it may be integrated into a larger, more robust vehicle for outdoor operations in challenging weather conditions.

The sensor system and control mechanisms of the TLU 200 may be adapted to suit each of these configurations. For standalone or towbar-attached implementations, additional sensors or control interfaces may be incorporated to ensure safe and efficient operation without the support of a full tow vehicle. When combined with different vehicles or trailers, the TLU's control systems may be integrated with the host vehicle's systems to provide seamless operation and enhanced functionality.

These various implementations of the TLU 200 may expand its applicability across a wide range of aircraft handling scenarios, from small regional airports to large international hubs, and from traditional ground operations to specialized military applications. The flexibility in configuration may allow operators to select the most appropriate implementation based on their specific needs, infrastructure, and operational constraints.

The automated turntable 202 may form a central part of TLU 200, providing a rotational platform. The automated turntable 202 may be designed to provide precise 360-degree rotation capabilities, allowing for flexible positioning of the aircraft's NLG. This rotational capability may be achieved through the use of a high-precision electric motor coupled with a gear reduction system. The gear reduction system may allow for smooth and controlled rotation, even when under the load of an aircraft.

In some implementations, the automated turntable 202 may utilize a large diameter bearing to support the rotational movement. This bearing may be designed to handle both the vertical loads from the aircraft's weight and the horizontal loads that may occur during towing operations. The outer race of this bearing may be fixed to the frame of the TLU 200, while the inner race may be connected to the rotating platform that supports the aircraft's NLG.

The rotational movement of the automated turntable 202 may be controlled by a servo system that provides precise position control. This servo system may include a motor driver that interprets commands from the main controller and translates them into the appropriate voltage and current signals to drive the motor. The motor may be equipped with an integrated brake system that can hold the turntable in position when rotation is not required, providing additional safety and stability.

To monitor and control the positioning of the automated turntable 202, an absolute encoder 216 may be incorporated into the system. The absolute encoder 216 may provide continuous, high-resolution feedback on the exact angular position of the turntable. Unlike incremental encoders that only measure relative movement, an absolute encoder can determine the turntable's position immediately upon startup, without requiring a homing or reference move.

In some aspects, the absolute encoder 216 may utilize a multi-turn design, allowing it to track multiple complete rotations of the turntable. This feature may be particularly useful in applications where the turntable needs to rotate through multiple revolutions during operation. The absolute encoder 216 may communicate with the system's controller using a digital interface, such as SSI (Synchronous Serial Interface) or BiSS (Bidirectional Serial Synchronous Interface), providing fast and reliable position data.

The controller may use the data from the absolute encoder 216 to implement closed-loop control of the turntable's position. This control system may allow for extremely precise positioning, potentially achieving accuracy within fractions of a degree. The controller may also use this position data to implement motion profiles for smooth acceleration and deceleration of the turntable, reducing wear on the system and providing a more stable platform for the aircraft's NLG.

In some implementations, the system may include multiple redundant absolute encoders to enhance reliability and safety. These redundant encoders may be compared in real-time to detect any discrepancies that could indicate a sensor failure or other system issue.

The combination of the high-precision motor, gear reduction system, and absolute encoder feedback may allow the automated turntable 202 to achieve both rapid rotation for efficient aircraft positioning and extremely fine adjustments for precise alignment. This capability may be particularly useful in confined spaces or when aligning the aircraft with specific ground markings or equipment.

TLU 200 includes a gate 204, which can serve as an entry and exit point for the TLU 200. Adjacent to the gate 204, on either side, are lock actuators 206 and gate actuators 208. These actuators are responsible for the operation and locking mechanism of the gate 204. In some cases, the gate 204 is configured to automatically unlock, open to receive the NLG, close to secure the NLG, and lock.

In some implementations, the actuators used in the TLU 200, such as the lock actuators 206, gate actuators 208, and moving floor actuators 214, may be entirely electrical. This configuration may eliminate the need for hydraulic systems, potentially offering several advantages.

Electrical actuators may provide precise control and positioning capabilities, allowing for smooth and accurate movements of the gate 204, moving floor 210, and other components. The use of electrical actuators may also eliminate concerns associated with hydraulic systems, such as fluid leaks, pressure loss, or temperature-related performance variations. This may result in a more environmentally friendly system, as there is no risk of hydraulic fluid contamination. Additionally, electrical actuators may require less maintenance compared to hydraulic systems, potentially reducing downtime and operational costs.

In some aspects, electrical actuators may offer improved energy efficiency, as they may only consume power when actively moving or holding a position. This characteristic may contribute to the overall energy efficiency of the tow vehicle 100 or standalone TLU 200, potentially extending operational time between charges for battery-powered implementations.

The electrical actuators may be designed with built-in position feedback mechanisms, allowing for real-time monitoring of their status and position. This feature may enhance the system's ability to detect and respond to any irregularities or malfunctions, potentially improving overall reliability and safety.

In some cases, the use of electrical actuators may allow for a more compact and lightweight design of the TLU 200. This may be particularly advantageous in applications where space or weight constraints are significant factors, such as in compact tow vehicles or portable systems.

In some implementations, the TLU 200 may incorporate an emergency gate release mechanism to allow manual opening of the gate 204 in the event of a power failure or system malfunction. This feature may enhance the safety and reliability of the TLU 200 by providing a backup method for releasing an aircraft's NLG in emergency situations.

The emergency gate release mechanism may be designed as a mechanical system that can be operated without electrical power. In some aspects, this mechanism may include a manual lever or handle located on the exterior of the TLU 200, easily accessible to ground personnel. When activated, this lever may disengage the lock actuators 206 and override the gate actuators 208, allowing the gate 204 to be opened manually.

In some aspects, the emergency gate release mechanism may be designed with a fail-safe approach, where the loss of power automatically triggers the release of the locking mechanism. This design may ensure that the gate 204 can be opened manually even if the emergency release lever is not immediately accessible or operable.

The TLU 200 incorporates a moving floor 210, which can be a segmented platform capable of horizontal and vertical movement. This moving floor 210 can be controlled by the moving floor actuators 214, positioned at opposite corners of the unit. In some embodiments, the moving floor 210 is configured to adjust to accommodate different nose wheel sizes. In some aspects, the moving floor 210 may be configured to automatically slide under the NLG wheel or wheels, working in conjunction with the NLG clamps 212 to effectively "grab" the NLG from both the top and bottom.

The moving floor 210 may incorporate a self-locking mechanism to prevent unintended movement under mechanical loads. This feature may enhance the safety and stability of the TLU 200 during aircraft handling operations. In some implementations, the self-locking mechanism may employ a brake system integrated with the moving floor actuators 214. This brake system may automatically engage when the actuators are not in operation, securing the moving floor 210 in its current position. The brakes may be designed to hold the full weight of the aircraft's NLG, ensuring that the moving floor 210 remains stationary even under maximum load conditions.

The control system of the TLU 200 may monitor the status of the self-locking mechanism, ensuring that it is properly engaged before allowing any load to be placed on the moving floor 210. This integration may provide an additional safety check in the aircraft handling process, potentially reducing the risk of accidents or equipment damage.

The operation of the moving floor 210 may involve a series of coordinated movements. As the TLU 200 surrounds the NLG, the moving floor 210 may extend outward, positioning itself beneath the NLG wheels. This extension may be controlled by the moving floor actuators 214, which may provide precise horizontal movement of the floor segments.

Once the moving floor 210 is properly positioned under the NLG wheels, the moving floor 210 may then function as an elevator mechanism. In this phase of operation, the moving floor actuators 214 may control the vertical movement of the floor, lifting the NLG off the ground. This lifting action may be synchronized with the overall operation of the TLU 200, allowing for a smooth and controlled elevation of the aircraft's nose.

The ability of the moving floor 210 to adjust to different nose wheel sizes may enhance the versatility of the TLU 200. This adaptability may be achieved through the use of segmented floor panels that can be individually controlled or through a flexible floor design that can conform to various wheel diameters.

In some implementations, sensors integrated into the moving floor 210 may detect the weight and position of the NLG wheels, providing feedback to the control system. This feedback may allow for real-time adjustments to the floor position and lifting force, ensuring optimal support and stability throughout the capturing and lifting process.

The moving floor 210, in combination with other components of the TLU 200, may contribute to a fully autonomous and precise method of aircraft handling. This system reduces the need for manual intervention, enhances safety, and improves the efficiency of ground operations in various aviation environments.

After the NLG has been lifted, the NLG clamps 212 may engage from above, securing the upper portion of the NLG. The combination of the moving floor 210 supporting from below and the NLG clamps 212 securing from above may create a stable and secure hold on the NLG.

One or more NLG clamps 212 (also referred to as nose wheel adapters) may be used to secure an aircraft's NLG. The NLG clamps 212 are positioned on opposite sides of the automated turntable 202. In some cases, the NLG clamps 212 are configured to automatically position themselves to hold down the NLG when weight is detected on the moving floor 210. The NLG clamps 212 may include electro-cylinders connected to the CAN bus.

The NLG clamps 212 may be operated by fully electric actuators and controlled by the controller to provide precise and efficient securing of the aircraft's NLG. In some implementations, each NLG clamp 212 may be equipped with its own dedicated electric actuator, allowing for independent control and movement of each clamp.

The electric actuators for the NLG clamps 212 may utilize high-torque servo motors coupled with precision gear systems. These motors may provide the necessary force to securely clamp the NLG while also allowing for fine adjustments in positioning. The gear systems may enable smooth and controlled movement of the clamps, potentially reducing wear on both the clamps and the aircraft's landing gear.

In some aspects, the controller may utilize feedback from various sensors to determine the optimal positioning and clamping force for the NLG clamps 212. These sensors may include load cells to measure the weight distribution on the moving floor 210, proximity sensors to detect the exact position of the NLG, and force sensors within the clamps themselves to monitor the applied pressure.

In some cases, the NLG clamps 212 may automatically adjust to accommodate different NLGs for various types of aircraft. This adjustment may be based on data from sensors 104 and/or sensors 106, which may identify the type of aircraft and/or the precise dimensions and configurations of the NLG. This adaptive capability may enable the TLU 200 to handle a wide range of aircraft types efficiently.

The controller may implement closed-loop control algorithms to manage the operation of the NLG clamps 212. When weight is detected on the moving floor 210, the controller may initiate a sequence to position the clamps. This sequence may involve gradually closing the clamps while continuously monitoring sensor feedback to ensure proper alignment and contact with the NLG.

In some implementations, the controller may automatically adjust the clamping force dynamically based on the aircraft's weight and environmental conditions. For example, in windy conditions, the controller may increase the clamping force to provide additional stability. The electric actuators may allow for rapid adjustments in response to changing conditions or operational requirements.

The controller may also coordinate the operation of the NLG clamps 212 with other components of the TLU 200. For instance, the clamping process may be synchronized with the movement of the gate 204 and the adjustment of the moving floor 210 to ensure a smooth and efficient capture of the NLG.

In some cases, the electric actuators for the NLG clamps 212 may incorporate built-in position encoders. These encoders may provide real-time feedback on the exact position of each clamp, allowing the controller to maintain precise control over the clamping process. This feedback may also be used for diagnostic purposes, potentially enabling early detection of any misalignments or mechanical issues.

The use of fully electric actuators for the NLG clamps 212 may offer advantages in terms of maintenance and reliability. These actuators may require less frequent maintenance compared to hydraulic systems, and their performance may be less affected by temperature variations. Additionally, the electric actuators may provide more consistent operation over time, potentially enhancing the overall reliability of the aircraft capturing process.

In some implementations, the controller may include safety features specifically designed for the operation of the NLG clamps 212. These features may include torque limiting to prevent over-clamping, obstacle detection to avoid potential collisions during clamp movement, and emergency release functions that can quickly disengage the clamps if necessary.

Figure 2B:
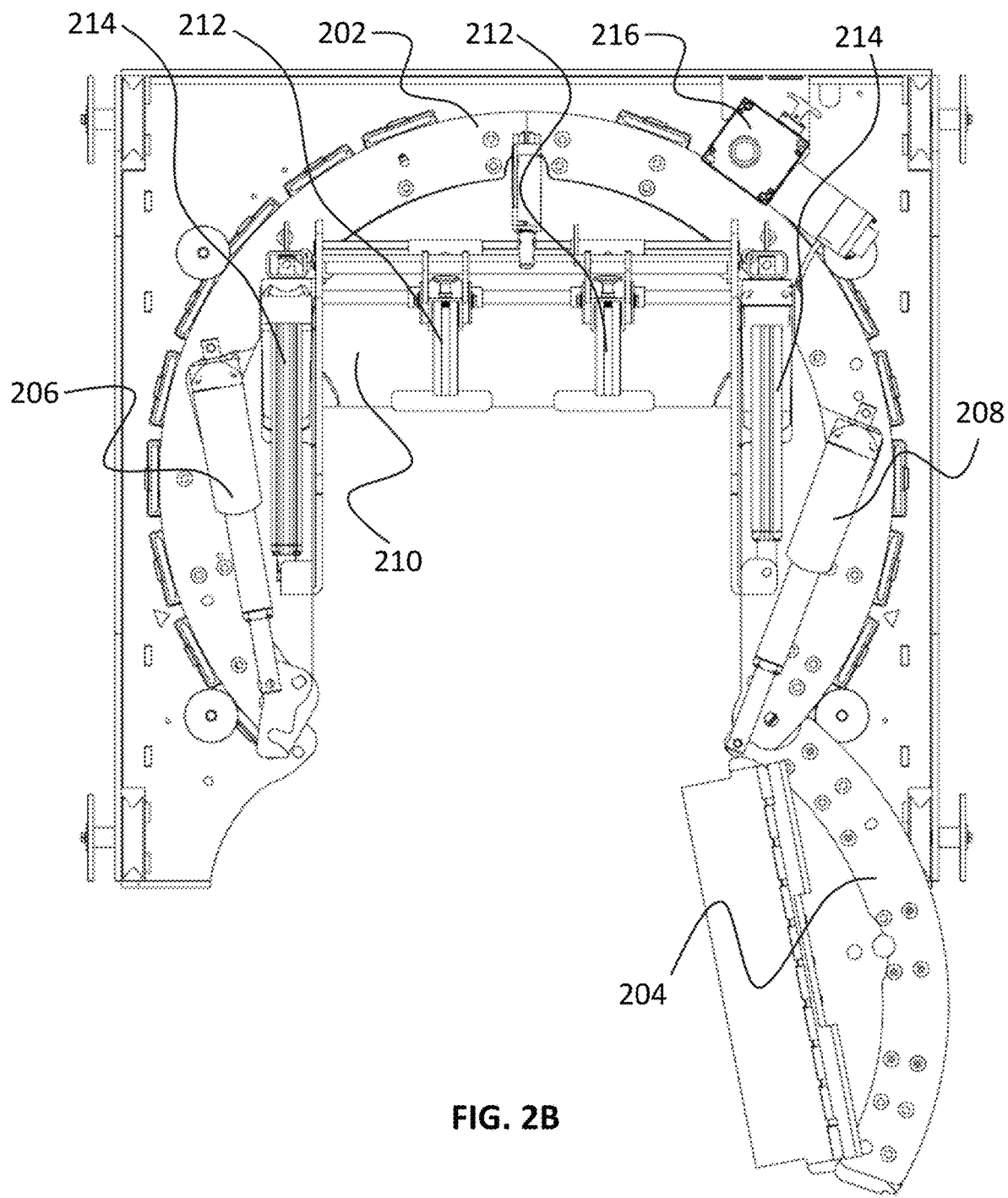
FIG. 2B illustrates a top view of the turntable lifting unit of FIG. 2A with an open gate.

Referring to FIG. 2B, the TLU 200 is depicted in a top view, providing a view of its components and their functions in capturing, securing, and manipulating the aircraft's NLG. The gate 204 in FIG. 2B is shown in an open position, allowing for the entry of the aircraft's NLG into the TLU 200. The gate 204 is coupled to the automated turntable 202 and is configured to automatically unlock and open to receive the NLG. Once the NLG is positioned within the TLU 200, the gate 204 is configured to close and secure the NLG. The gate 204 is then locked to ensure the secure attachment of the NLG to the TLU 200.

Adjacent to the gate 204, on either side, are lock actuators 206 and gate actuators 208. These actuators are responsible for the operation and locking mechanism of the gate 204. The lock actuators 206 are configured to engage and disengage the locking mechanism of the gate 204, ensuring that the gate 204 remains securely closed during the aircraft capturing and lifting process. The gate actuators 208 are responsible for the opening and closing operations of the gate 204.

The autonomous operation of the gate 204 and its associated actuators 206 and 208 contributes to the overall efficiency and safety of the aircraft capturing and lifting process. By automating these operations, the need for manual intervention is reduced, minimizing the risk of human error and potential damage to the aircraft's NLG. Furthermore, the autonomous operation of the gate 204 allows for rapid and precise capturing and lifting of the aircraft, enhancing the overall efficiency of the aircraft ground handling operations.

Figure 2C:
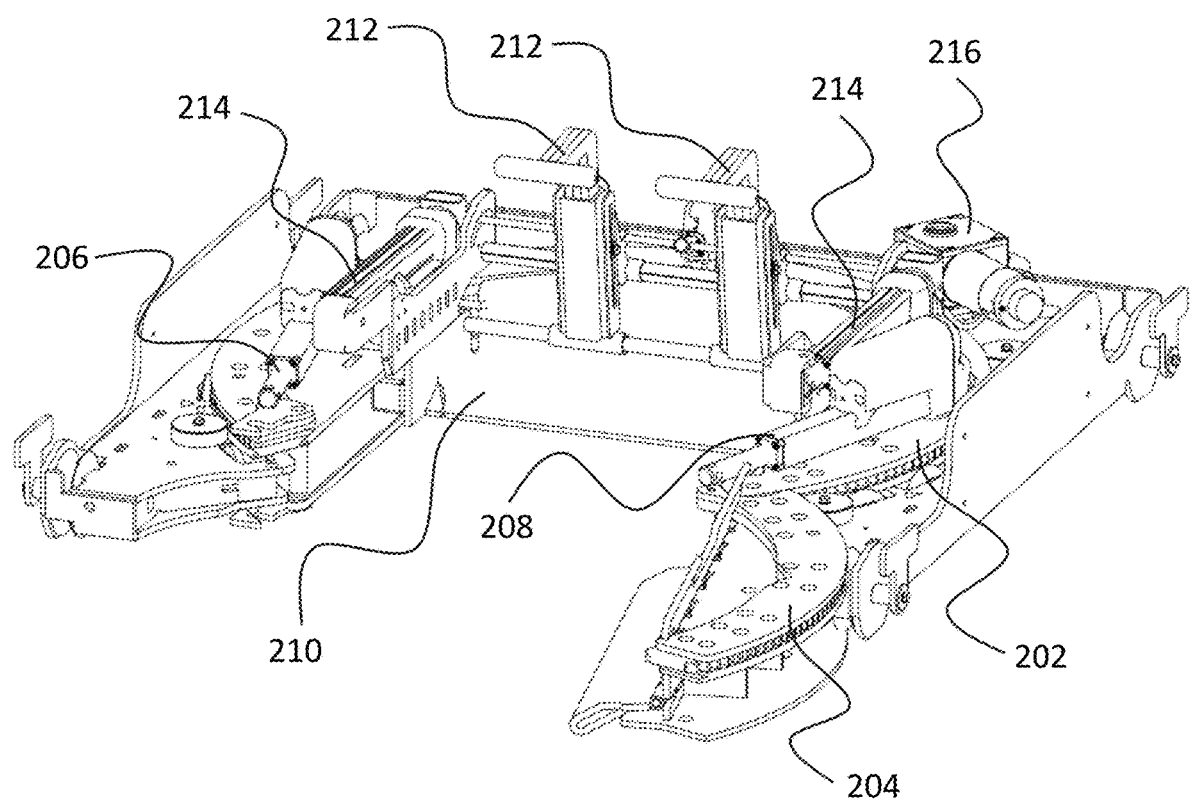
FIG. 2C illustrates a perspective view of the turntable lifting unit of FIG. 2A with an open gate.

Referring to FIG. 2C, the TLU 200 is depicted in a perspective view. The integration of the components described above may enable a series of autonomous processes for adjusting to, securing, and lifting the aircraft's NLG. The system may first use sensor data to determine the approaching aircraft's NLG configuration. Based on this information, the moving floor 210 and NLG clamps 212 may adjust to the appropriate positions.

As the aircraft approaches, the gate 204 may open, allowing the NLG to enter the unit. Once the NLG is detected in the correct position, the gate 204 may close and lock, securing the NLG within the unit. The moving floor 210 may then make fine adjustments to ensure optimal support.

With the NLG properly secured, the automated turntable 202 may initiate the lifting process, while the NLG clamps 212 engage to hold the NLG securely in place. Throughout this process, the absolute encoder 216 may provide continuous feedback to ensure precise control and positioning of all components.

This autonomous sequence may streamline the aircraft capturing and lifting process, potentially reducing the time required for ground operations and minimizing the risk of human error or equipment damage. The design of the TLU 200 may allow for efficient handling of various aircraft types, adapting to different NLG configurations and sizes with minimal manual intervention.

During autonomous pushback processes, the TLU 200 may work in coordination with the tow vehicle's sensor system. As the tow vehicle follows the pushback line and makes turns, the TLU 200 may automatically adjust its position and orientation to maintain the proper alignment of the NLG.

In some cases, the TLU 200 may include additional sensors specifically designed to monitor the orientation of the NLG relative to the aircraft's roll axis. These sensors may provide real-time data that allows the system to make immediate corrections if any misalignment is detected.

The CAN bus may facilitate rapid communication between all components of the TLU 200 and the tow vehicle's control systems. This high-speed data exchange may enable the system to respond quickly to any changes in alignment, ensuring that the NLG remains straight relative to the aircraft's roll axis throughout the pushback and towing operations.

Figure 3:
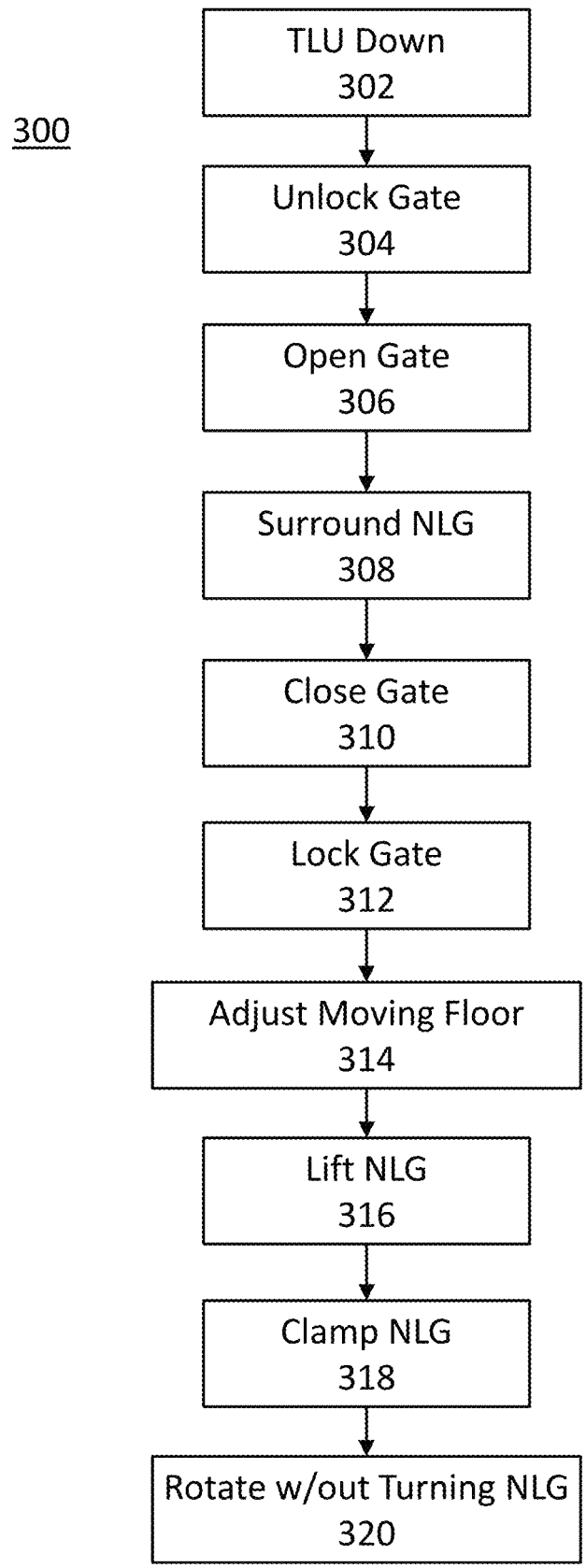
FIG. 3 illustrates a flowchart for an autonomous aircraft capturing and lifting process, according to aspects of the present disclosure.

FIG. 3 illustrates an autonomous aircraft capturing process 300 that may involve a sequence of steps for lowering the TLU, securing the NLG, and preparing for aircraft repositioning. The process may begin with step 302, where the TLU is lowered into position. This step may involve adjusting the height of the TLU to align with the aircraft's NLG.

Following the lowering of the TLU, the process may proceed to step 304, where the gate is unlocked. This action may prepare the TLU to receive the aircraft's NLG. Once unlocked, the process may move to step 306, where the gate is opened. The open gate may provide a clear path for the NLG to enter the TLU.

In step 308, the TLU may surround the NLG. This step may involve precise positioning of the TLU around the NLG, using sensor data to guide the alignment.

In some embodiments, the TLU may operate in coordination with the tow vehicle's drive system to automatically maneuver the tow vehicle around the NLG and adjust the TLU accordingly to capture the NLG. This coordinated operation may involve a sophisticated interplay between the tow vehicle's sensors, drive system, and the TLU's components.

The tow vehicle's sensor system, which may include sensors 104 and 106, may continuously scan the environment to detect the position and orientation of the aircraft's NLG. As the tow vehicle approaches the aircraft, the controller may process this sensor data in real-time to determine the optimal path for positioning the TLU around the NLG.

Based on this processed data, the controller may send commands to the tow vehicle's drive system, which may include the drive wheels 110. These commands may direct the tow vehicle to execute precise movements, potentially including forward, backward, and rotational maneuvers. The drive system may utilize its independent wheel control to perform these movements with a high degree of accuracy.

As the tow vehicle maneuvers, the TLU may simultaneously adjust its components in preparation for NLG capture. The gate 204 may open at the appropriate time, guided by the gate actuators 208. The moving floor 210 may adjust its position using the moving floor actuators 214, preparing to receive the NLG. The NLG clamps 212 may also pre-position themselves based on the anticipated NLG configuration.

The controller may continuously update these adjustments as the tow vehicle approaches the NLG, using feedback from the absolute encoder 216 and other sensors to ensure precise alignment. In some cases, the automated turntable 202 may rotate to achieve the optimal orientation for NLG capture.

In some implementations, the system may utilize machine learning algorithms to optimize this coordinated operation. These algorithms may analyze data from previous capture operations to refine the maneuvering and adjustment processes, potentially improving efficiency and accuracy over time.

The seamless coordination between the tow vehicle's drive system and the TLU may allow for swift and precise NLG capture, potentially reducing the time required for aircraft handling operations. This autonomous approach may also enhance safety by minimizing the need for personnel to be in close proximity to the aircraft during the capture process.

Once the NLG is properly positioned within the TLU, the process may advance to step 310, where the gate is closed. This action may be followed by step 312, where the gate is locked, securing the NLG within the TLU.

After the NLG is enclosed and secured, the process may proceed to step 314, where the moving floor is adjusted. This adjustment may accommodate the specific dimensions and configuration of the captured NLG. In some aspects, the moving floor may be designed to slide under the NLG in a manner similar to a wedge, providing pressure on the opposite side of the NLG wheel(s) as the gate.

Once the NLG is positioned on the moving floor 210 and the gate 204 is closed and locked, the system may initiate the lifting process at step 316. The moving floor actuators 214 may raise the entire floor assembly, including the captured NLG. This lifting action may raise the aircraft's nose so that it can be clamped and fully secured prior to any towing and/or pushback operations.

In step 318, the NLG may be clamped (e.g., with NLG clamps 212), providing additional security and stability at the top of the NLG.

The final step in the process, step 320, may involve rotating the TLU without turning the NLG, i.e., the tow vehicle can turn in place while maintaining the orientation of the TLU and the captured NLG. This capability may enable the tow vehicle to begin pulling the aircraft in any direction without applying undue stress to the NLG.

The tow vehicle may utilize its drive system, which may include independently controlled drive wheels, to execute a rotation around its vertical axis. During this rotation, the TLU may remain stationary relative to the aircraft, potentially preventing any twisting forces from being applied to the NLG. This feature may be particularly useful in confined spaces or when precise aircraft positioning is required.

In some implementations, the controller may coordinate the rotation of the tow vehicle with real-time feedback from the absolute encoder and other sensors within the TLU. This coordination may help ensure that the orientation of the NLG remains constant throughout the rotation process. The system may make continuous micro-adjustments to compensate for any slight deviations, potentially maintaining the alignment between the aircraft and the tow vehicle.

The ability to rotate without turning the NLG may offer several potential benefits. It may reduce wear and tear on the aircraft's landing gear by minimizing lateral forces during maneuvering. This feature may also enhance operational flexibility, allowing the tow vehicle to reposition itself relative to the aircraft without the need for complex multi-point turns or disconnecting and reconnecting the NLG.

In some cases, this rotational capability may be combined with the tow vehicle's visual line guidance and object recognition system. The system may detect obstacles or markings in the surrounding environment and use this information to guide the rotation process. This integration may allow for precise alignment with taxiway lines or positioning within tight hangar spaces.

The rotation without NLG turning feature may also contribute to the overall efficiency of ground operations. It may allow for quicker aircraft repositioning, potentially reducing turnaround times and improving gate utilization at busy airports. In some implementations, this feature may be particularly valuable for pushback operations, enabling the tow vehicle to align itself with the designated pushback path without placing stress on the aircraft's landing gear.

Figure 4:
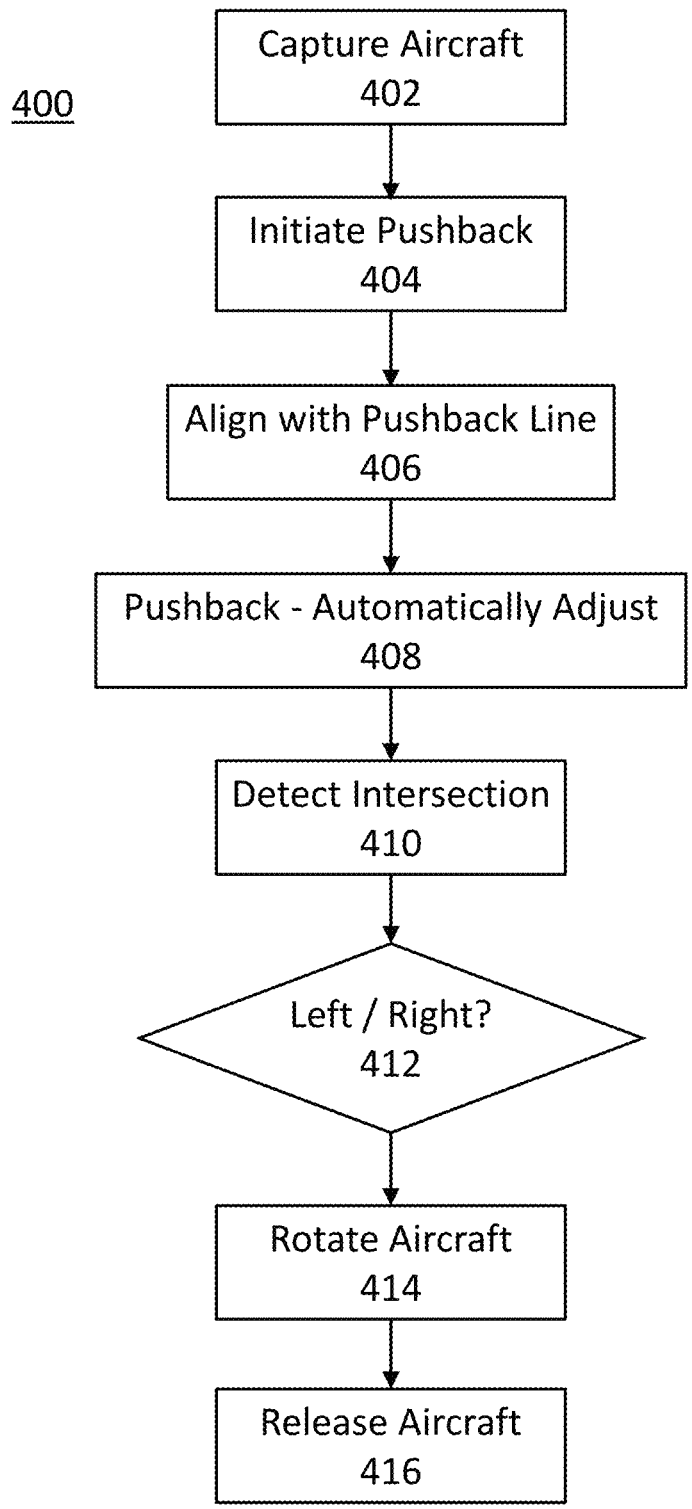
FIG. 4 illustrates a flowchart for an autonomous pushback process, according to aspects of the present disclosure.

FIG. 4 illustrates an autonomous pushback process 400 that may involve a sequence of steps for capturing an aircraft, initiating pushback, and aligning the aircraft with a pushback line. The process may begin with step 402, where the aircraft is captured by a tow vehicle (e.g., an autonomous or semi-autonomous tow vehicle) using the autonomous aircraft capturing process 300 described in FIG. 3. This step may involve securing the aircraft's nose landing gear (NLG) within the turntable lifting unit (TLU) of the tow vehicle.

Figure 5:
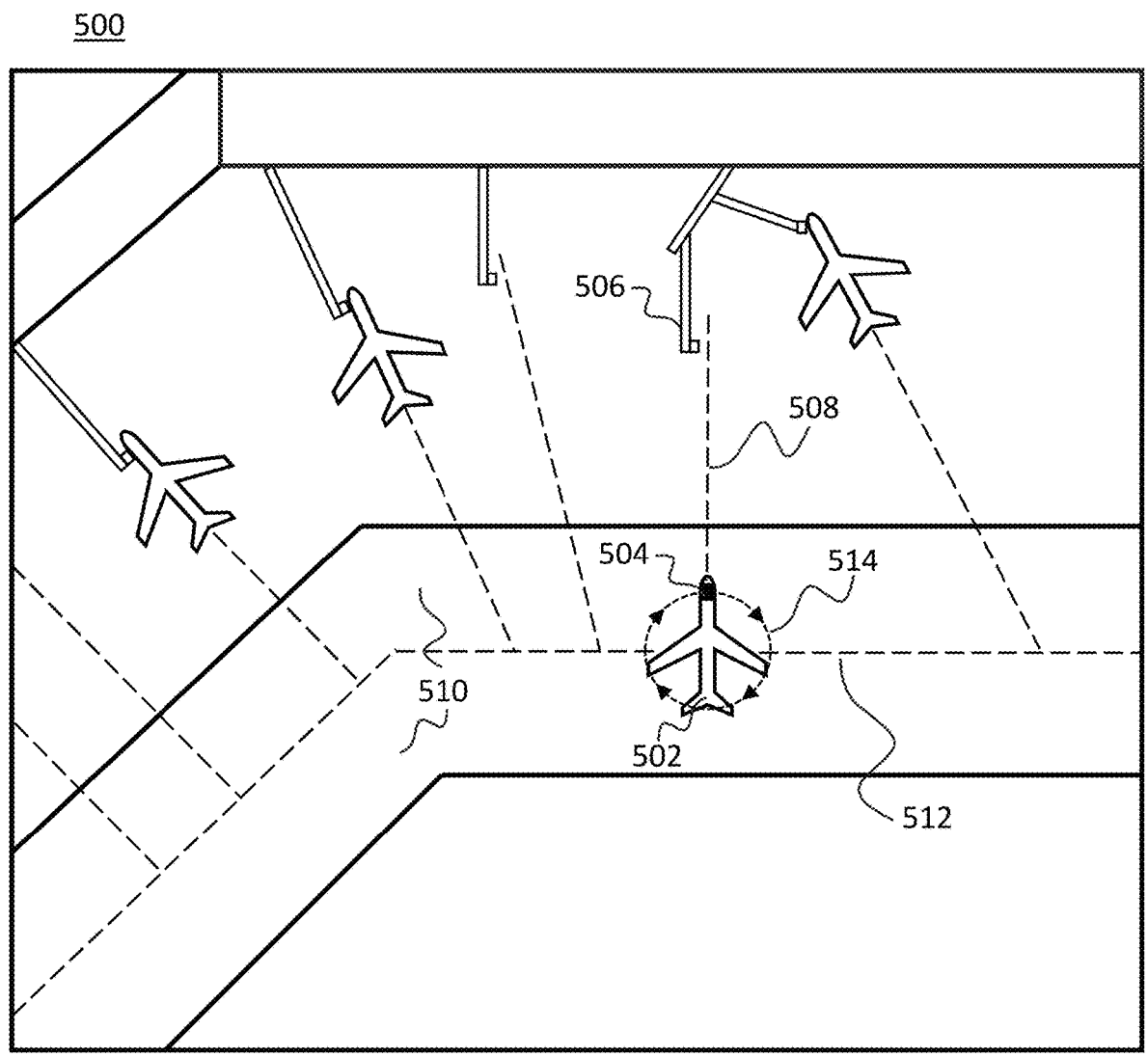
FIG. 5 illustrates a top view diagram of an airport layout and autonomous pushback operation, according to aspects of the present disclosure.

In airports and on aircraft carriers, pushback lines may be used as visual guides for aircraft ground movements, particularly during pushback operations. These lines may be painted or otherwise marked on the ground surface, providing a clear path for aircraft to follow when being pushed back from gates, parking positions, or other stationary locations. FIG. 5, for example, illustrates a sample airport layout 500, including various aircraft 502, tow vehicle 504, passenger gates 506, pushback lines 508, taxiway 510, and centerline 512.

At airports, pushback lines may serve several purposes. They may help guide tow vehicles and aircraft along predetermined routes, ensuring safe clearance from nearby obstacles, other aircraft, and ground equipment. These lines may also assist in maintaining orderly traffic flow on the apron or tarmac, potentially reducing the risk of collisions or congestion.

On aircraft carriers, pushback lines may be particularly crucial due to the limited space available on the flight deck. These lines may guide precise aircraft movements during repositioning operations, helping to optimize the use of available deck space and facilitate efficient launch and recovery operations.

The autonomous navigation of pushback lines by aspects of the disclosure may significantly enhance safety, increase efficiency, and reduce personnel requirements during pushback operations. By utilizing advanced sensor systems and intelligent control algorithms, the tow vehicle may precisely follow pushback lines without constant human guidance.

In terms of safety, the autonomous system may continuously monitor the environment for potential obstacles or hazards using its sensor array. This constant vigilance may reduce the risk of collisions with other vehicles, equipment, or personnel on the tarmac. The system may also maintain a consistent and optimal distance from the aircraft, potentially minimizing the risk of damage to the aircraft or tow vehicle during the pushback process.

Efficiency may be improved in several ways. The autonomous system may execute pushback maneuvers with a high degree of precision and consistency, potentially reducing the time required for each operation. This precision may allow for smoother transitions between different phases of the pushback process, such as initial alignment, straight pushback, and turns at intersections. The system may also optimize the pushback path based on real-time data, potentially adapting to changing conditions on the tarmac more quickly than a human operator.

The reduction in required personnel may also be substantial. Traditional pushback operations often require multiple ground crew members, including a tow vehicle operator, wing walkers, and a person in communication with the flight deck. With autonomous pushback capabilities, many of these roles may be consolidated or eliminated. The system may perform the functions of guidance, obstacle detection, and aircraft alignment without direct human intervention. This reduction in personnel may lead to cost savings for airlines and airport operators, as well as potentially increasing the number of simultaneous pushback operations that can be managed with existing staff levels.

Furthermore, the autonomous system may operate effectively in various weather conditions and visibility levels, potentially maintaining consistent performance in situations where human operators might struggle. This capability may contribute to improved on-time performance and reduced weather-related delays in pushback operations.

The integration of the autonomous pushback system with other airport management systems may further enhance its benefits. For example, the system may coordinate with air traffic control and gate management systems to optimize the timing and routing of pushback operations, potentially improving overall airport efficiency.

Following the capture of the aircraft, the process may proceed to step 404, where the pushback is initiated. In this step, the tow vehicle (e.g., tow vehicle 504) may begin to move, pushing the aircraft (e.g., aircraft 502) away from its parking position (e.g., at passenger gate 506) toward a taxiway or runway (e.g., taxiway 510). The tow vehicle may include a controller configured to receive data from the sensor system, which may comprise sensors 104 and 106. This sensor system may detect the position of the NLG relative to a pushback line (e.g., pushback line 508) on the ground.

In step 406, the tow vehicle in coordination with the TLU may automatically align the aircraft with the pushback line. The controller may process the data from the sensor system to determine the position of the NLG relative to the pushback line. Based on this information, the controller may control the TLU and automatically adjust the position of the tow vehicle relative to the NLG. This adjustment may help maintain alignment of the aircraft with the pushback line during the pushback operation.

In step 408, the autonomous pushback process may involve continuously adjusting the position of the aircraft tow vehicle to maintain alignment of the aircraft with the pushback line. The controller may process real-time data from the sensor system to determine any deviations from the desired alignment. Based on this information, the controller may send commands to the turntable lifting unit and drive systems of the tow vehicle to make fine adjustments to the vehicle's position and orientation.

As the pushback operation continues, the controller may be configured to detect, at step 410, when the main landing gear (MLG) of the aircraft reach an intersection of the pushback line with another line (e.g., a runway or taxiway centerline 512) indicating a turn. This detection may be accomplished through the sensor system or the visual line guidance and object recognition system. The system may use various methods to detect the pushback line and intersections, such as computer vision algorithms, LiDAR technology, or other sensing techniques.

As the pushback operation progresses, the system may continuously monitor for intersections in the pushback line. When an intersection is detected, the controller may analyze the geometry of the intersection to determine the available turn options. This analysis may involve processing data from multiple sensors to create a comprehensive understanding of the intersection layout.

Upon detecting an intersection, the controller may be configured to receive input indicating a turn direction at step 412. This input may come from a human operator (e.g., via a user interface on the tow vehicle or remote control system) or from a pre-programmed pushback plan. In some implementations, the system may also be capable of autonomously determining the appropriate turn direction based on the airport layout and the aircraft's destination, signals or gestures from ground personnel, radio instructions from air traffic control or ground control, and/or instructions from air traffic management systems.

Once the turn direction is determined, the system may initiate the aircraft rotation process in step 414. Based on the detected intersection and the indicated turn direction, the controller may automatically rotate the aircraft in place on its main landing gear (e.g., as illustrated by turn in place operation 514 in FIG. 5). This rotation may be achieved by causing the two sets of MLG wheels to rotate in opposite directions, effecting a stationary turn.

In some implementations, the sensor system may determine how to rotate the aircraft by calculating the distance between the NLG and the MLG. This calculation may be performed using data from various sensors, such as LiDAR, cameras, or ultrasonic sensors, which may provide precise measurements of the aircraft's dimensions and wheel positions.

Once the distance between the NLG and MLG is determined, the controller may use this information to calculate the optimal angle at which the tow vehicle should position itself relative to the aircraft. This positioning may allow the tow vehicle to initiate a turn that causes the wheels of the MLG to rotate in opposite directions.

The tow vehicle may then align itself at the calculated angle. As the tow vehicle begins to move, it may apply force to the NLG in a way that causes the aircraft to pivot around its center of gravity. This pivoting motion may result in the MLG wheels rotating in opposite directions, with one set of wheels moving forward and the other set moving backward.

By initiating the turn in this manner, the system may minimize the lateral forces applied to the MLG wheels. This approach may result in little to no strain on the MLG wheels during the turning process, potentially reducing wear and tear on the aircraft's landing gear components.

The controller may continuously monitor the rotation of the aircraft using its sensor system, making real-time adjustments to the tow vehicle's position and force application as needed. This ongoing adjustment may help maintain the optimal turning angle throughout the rotation process, ensuring smooth and efficient aircraft movement.

In some aspects, the system may also take into account factors such as the aircraft's weight distribution, tire pressure, and surface conditions when calculating the optimal turning strategy. These considerations may allow the system to further refine its approach, potentially resulting in even smoother and more efficient aircraft rotations.

During the rotation, the system may continuously monitor the aircraft's position relative to the new pushback line direction. The controller may make real-time adjustments to ensure a smooth transition onto the new path, potentially using predictive algorithms to anticipate and correct for any deviations.

Throughout the pushback operation, the controller may continuously adjust the position of the tow vehicle to maintain alignment with the pushback line and execute any required turns. This autonomous process may help ensure precise and consistent pushback operations, potentially reducing the risk of errors and improving overall efficiency.

In some implementations, the autonomous pushback process may continue indefinitely, accommodating any number of turns or directional changes, until the pilot of the aircraft assumes control for taxiing or take-off. This extended pushback capability may allow for greater flexibility in aircraft ground movements, potentially enabling more efficient use of airport taxiways and runways.

The tow vehicle may be configured to follow complex pushback paths that may include multiple turns, curves, and straight sections. The visual line guidance and object recognition system may continuously detect and interpret ground markings, allowing the tow vehicle to navigate these paths accurately. In some cases, the system may be capable of following temporary or newly painted lines, adapting to changes in airport layout or traffic flow.

During extended pushback operations, the controller may continuously monitor for potential obstacles or conflicts with other ground traffic. The sensor system may detect other vehicles, equipment, or personnel in the vicinity, and the controller may adjust the pushback path or speed accordingly to maintain safe operations. In some implementations, the system may be integrated with airport traffic management systems, allowing for coordinated movements with other aircraft and ground vehicles.

The autonomous pushback system may also be capable of responding to dynamic instructions from air traffic control or ground control. In some aspects, the system may receive updated routing information in real-time, allowing for on-the-fly adjustments to the pushback path. This flexibility may be particularly useful in busy airport environments where traffic patterns may change rapidly.

Upon completion of the pushback operation, the controller may be further configured to automatically release the aircraft from the tow vehicle in step 416. The controller may first bring the tow vehicle to a complete stop at the designated release point. It may then command the TLU to lower the aircraft's NLG to the ground.

Once the NLG is firmly on the ground, the system may command the gate of the TLU to unlock and open. The tow vehicle may then slowly move away from the aircraft, ensuring that all components are clear of the aircraft's structure. Throughout this release process, the system may continue to monitor the position and status of all components using its sensor array to ensure a safe and controlled release. After the physical separation is complete, the system may perform a final check to confirm that all systems are disengaged and that the tow vehicle is at a safe distance from the aircraft.

The autonomous release process may help streamline the transition from pushback to taxiing, potentially reducing the time required for this phase of ground operations. By automating these steps, the system may also help reduce the risk of errors or miscommunications that could occur during a manual handover process.

As discussed above, the autonomous aircraft capturing and lifting system may incorporate advanced control and sensing capabilities to enhance its performance in aircraft handling and towing operations. The controller may integrate data from multiple sensors to create a comprehensive understanding of the system's environment and the aircraft's position.

In some aspects, the autonomous aircraft capturing and lifting system may include a visual line guidance and object recognition system. The system may be camera-based and may be configured to detect various visual cues, including line markings, objects, or symbols on the ground or in the surrounding environment, as well as human gestures from ground personnel.

In some implementations, the system may include an artificial intelligence/machine learning (AI/ML) component. This component may be trained on real-world airport operations data, allowing it to interface effectively with the sensor fusion system. The AI/ML component may assist in object, symbol, and gesture recognition, potentially improving the system's ability to interpret its environment. Additionally, the AI/ML component may contribute to decision-making processes, potentially enhancing the system's autonomy and adaptability.

The AI/ML component may also provide additional safety features. For example, it may be capable of identifying potential hazards or unusual situations that might not be easily detected by traditional sensor systems. This enhanced situational awareness may contribute to safer operations in busy airport environments.

In some aspects, the system may include an interface component configured to access a digital twin of the operating environment. This digital twin may be a fixed representation of the airport or aircraft carrier layout stored in onboard memory, or it may be updated in real-time through wireless communications to reflect current conditions. By interfacing with this digital twin, the system may gain access to detailed information about the operating environment, potentially enhancing its ability to navigate and make decisions.

The digital twin interface may assist in the autonomous decision-making process by providing additional context for the system's operations. For example, it may offer information about scheduled aircraft movements, temporary obstacles, or changes in airport layout. This information may allow the system to anticipate challenges and adjust its operations accordingly, potentially improving efficiency and safety.

In some implementations, the digital twin data may reside in cloud-based storage systems, allowing for centralized management and real-time updates across multiple tow vehicles and airport systems. This cloud-based approach may offer several advantages for the autonomous aircraft capturing and lifting system.

The cloud infrastructure may provide scalable storage capacity, enabling the system to maintain detailed digital representations of multiple airports or aircraft carriers. This may allow tow vehicles to access up-to-date information about various operating environments, even when moving between different locations.

Real-time updates to the digital twin data may be facilitated through the cloud. As changes occur in the physical environment, such as temporary runway closures, construction zones, or equipment relocations, these updates may be immediately reflected in the cloud-based digital twin. Tow vehicles may then access this updated information in real-time, ensuring their operations are based on the most current environmental data.

The cloud-based digital twin may also enable collaborative updating and maintenance of the environmental data. Multiple stakeholders, including airport authorities, airlines, and ground handling companies, may contribute to and benefit from the shared digital representation. This collaborative approach may result in a more comprehensive and accurate digital twin.

In some aspects, the cloud-based digital twin may integrate data from various sources, including IoT sensors deployed throughout the airport, weather stations, and air traffic management systems. This integration may provide a rich, multi-layered representation of the operating environment, potentially enhancing the tow vehicle's ability to make informed decisions.

The cloud infrastructure may also facilitate advanced analytics and machine learning processes on the digital twin data. These processes may identify patterns, predict potential issues, and optimize routes based on historical and real-time data, potentially improving the efficiency and safety of tow vehicle operations.

The integration of these advanced control and sensing capabilities may result in a highly sophisticated autonomous aircraft capturing and lifting system. By combining sensor fusion, visual recognition, AI/ML capabilities, and digital twin integration, the system may be capable of performing complex aircraft handling and towing operations with a high degree of precision and adaptability.

In other aspects of the disclosure, the tow vehicle may be designed to operate in a wide range of environmental conditions, enhancing its versatility and reliability in various airport settings. In some aspects, the tow vehicle may be capable of functioning in temperatures ranging from −18° F. to +122° F., allowing for operation in both extremely cold and hot climates. The vehicle may also be designed to withstand up to 90% relative humidity, potentially enabling its use in humid coastal or tropical environments.

The drivetrain of the tow vehicle may incorporate advanced features for improved performance and reliability. In some implementations, the vehicle may be equipped with two individual drive units, each containing a redundant drive system (i.e., four total drive wheels). These drive systems may utilize twin electrical high-torque rotary drive hub gear motors, potentially providing enhanced traction and maneuverability. The power supply for these motors may be a 48V system, with a total effective power output of 20 kW AC. This configuration may offer a balance of power and efficiency suitable for aircraft towing operations.

In some implementations, for enhanced redundancy and performance, each drive wheel of the tow vehicle may be powered by its own dedicated motor, such as a 5 kW motor. This configuration may provide several potential benefits, including improved traction control, increased maneuverability, and enhanced fault tolerance.

The system may be designed to optimize efficiency during operation. For instance, once the initial inertia of the aircraft is overcome and the tow vehicle is in motion, the controller may selectively deactivate one or more motors. This approach may help conserve energy and extend the operational range of the vehicle.

The controller may continuously monitor various parameters such as wheel speed, traction, and power consumption. In some cases, if a wheel loses traction or if additional power is required, the system may rapidly reactivate the previously deactivated motors. This dynamic power management strategy may allow the tow vehicle to maintain optimal performance while minimizing energy consumption.

To enhance durability and reduce maintenance requirements, the tow vehicle may be fitted with solid rubber tires. These tires may offer increased resistance to wear and tear compared to pneumatic tires, potentially extending their operational lifespan and reducing the frequency of tire replacements.

The towing capacity of the vehicle may be substantial, potentially allowing it to handle a wide range of aircraft sizes. In some aspects, the tow vehicle may be capable of towing airframes with a maximum takeoff weight (MTOW) of up to 132,000 lbs. This capacity may enable the vehicle to service a variety of commercial and military aircraft, enhancing its versatility in different airport environments.

One of the key advantages of the tow vehicle may be its potential to improve space utilization in hangar and apron areas. The design and maneuverability of the vehicle may allow for more efficient positioning and movement of aircraft in confined spaces. In some cases, the use of this tow vehicle may increase the utilization of hangar space by up to 60% compared to conventional tow tractors. This improved space efficiency may lead to significant operational benefits for airports and maintenance facilities, potentially allowing for the accommodation of more aircraft in a given area or reducing the need for expansive hangar facilities.

Embodiments of the present disclosure also provide a modular high-current battery management system designed for electric vehicle applications, including, for example, in the context of aircraft towing vehicles. The system comprises one or more battery pack modules, each housing a plurality of lithium iron phosphate (LiFePO4) batteries. A controller within each module is configured to monitor and control the batteries, managing current flow through a high-current DC power relay. The system also incorporates at least one supercapacitor to manage rapid changes in current flow, and one or more MOSFETs or IGBTs to regulate voltage and current levels. The battery pack modules are designed to be removable and replaceable, offering flexibility in capacity and power output to accommodate various operational needs. The system is capable of providing a peak current output of at least 1000 amperes, making it suitable for high-power applications such as aircraft towing and ignition/startup operations.

The modular design of the battery management system may offer several benefits for high-current applications such as aircraft towing vehicles. In some aspects, modularity allows for easy scalability of the system, enabling users to adjust the power capacity by adding or removing battery pack modules as needed. This flexibility may accommodate various operational requirements and aircraft sizes without necessitating a complete system overhaul.

In some cases, the modular approach may facilitate maintenance and reduce downtime. If a single battery pack module experiences issues, it can be quickly replaced with a functional unit, allowing the vehicle to return to service rapidly. This hot-swappable nature of the modules may contribute to increased operational efficiency and reduced maintenance costs.

The modular design may also enhance the system's longevity and upgrade potential. As battery technology advances, individual modules can be replaced with newer, more efficient versions without replacing the entire system. This aspect may provide a cost-effective path for system improvements over time.

In some implementations, the modular architecture may improve thermal management and safety. By distributing the battery capacity across multiple modules, heat generation may be more evenly spread, potentially reducing the risk of thermal runaway and improving overall system reliability.

The modularity may also offer logistical advantages. Smaller, standardized battery pack modules may be easier to transport, store, and handle compared to a single large battery system. This characteristic may simplify inventory management and streamline the supply chain for replacement parts.

In the context of autonomous and semi-autonomous aircraft towing operations and similar applications where continuous, low-maintenance operations are necessary, swappable battery pack modules may offer several advantages:

The use of swappable battery pack modules may enable near-continuous operation of towing vehicles. When a battery pack's charge is depleted, it can be quickly replaced with a fully charged module, allowing the vehicle to resume operation with minimal downtime. This feature may be particularly beneficial in busy airport environments where towing vehicles need to operate around the clock.

Swappable modules may reduce the need for dedicated charging time for each vehicle. Instead of taking a vehicle out of service for charging, operators can simply swap in a charged battery pack and return the depleted pack to a charging station. This approach may optimize fleet utilization and increase operational efficiency.

In some cases, the ability to quickly swap battery packs may allow for more efficient energy management across a fleet of vehicles. Charged modules can be strategically distributed to vehicles based on their immediate power needs and operational schedules, potentially improving overall energy utilization.

The modular nature of swappable battery packs may simplify maintenance procedures. If a battery pack exhibits performance issues or requires servicing, it can be easily removed and replaced without taking the entire vehicle out of service for an extended period. This feature may contribute to reduced maintenance downtime and increased vehicle availability.

Swappable battery modules may offer flexibility in adapting to varying power requirements. For instance, heavier aircraft or challenging towing conditions may require more power. In such cases, additional battery modules could be added to provide extra capacity and power output as needed.

In autonomous or semi-autonomous operations, the ability to quickly swap battery packs may reduce the need for human intervention in the charging process.

In some implementations, vehicles may be configured to autonomously return to a charging location when battery levels are low or on a preconfigured schedule to improve the efficiency of charging a fleet of vehicles. This autonomous charging management system may incorporate several features to optimize fleet operations.

The vehicles may be equipped with onboard battery monitoring systems that continuously track the state of charge. When the battery level reaches a predetermined threshold, the vehicle may automatically initiate a return sequence to the charging station. This threshold may be dynamically adjusted based on factors such as distance to the charging station, current workload, and overall fleet status.

In some aspects, the vehicles may be programmed with predefined routes to the charging station, taking into account factors such as traffic patterns, obstacles, and the most energy-efficient path. The vehicles may utilize GPS, a sensor fusion system, and/or other navigation technologies to safely navigate to the charging location.

The system may also incorporate a centralized fleet management software that coordinates the charging schedules of multiple vehicles. This software may analyze factors such as operational demands, energy consumption patterns, and charging station availability to create optimized charging schedules. Vehicles may be assigned specific time slots for charging to prevent congestion at the charging station and ensure a continuous availability of operational vehicles.

The autonomous charging system may also include features for prioritizing charging based on upcoming tasks or schedules. Vehicles with imminent assignments may be given priority in the charging queue to ensure they have sufficient charge for their next operation.

The use of swappable modules may also facilitate easier upgrades to battery technology. As more advanced battery technologies become available, individual modules can be replaced or upgraded without the need to replace entire vehicle fleets, potentially extending the operational life of towing vehicles.

In some implementations, swappable battery modules may enable more efficient use of charging infrastructure. By allowing batteries to be charged separately from vehicles, charging stations can be optimized for continuous operation, potentially reducing the overall number of charging points required.

Figure 6:
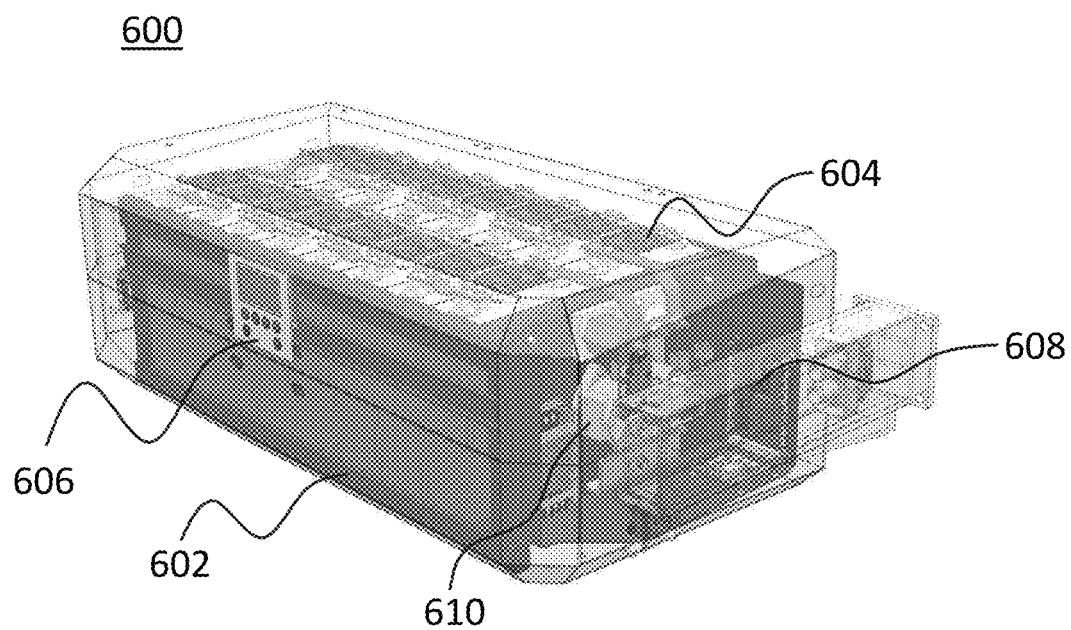
FIG. 6 illustrates an isometric view of a battery pack, according to aspects of the present disclosure.

FIG. 6 illustrates a battery pack module 600 in accordance with embodiments of the present disclosure. The battery pack module 600 comprises various components, including a battery frame 602, slave units 604, a display 606, a controller 608, and power relays 610. The battery frame 602 provides structural support and houses the internal components of the battery pack module 600. The slave units 604 are arranged in rows within the battery frame 602, representing individual battery cells or modules. These slave units 604 may comprise lithium iron phosphate (LiFePO4) batteries, which are known for their high energy density and long cycle life.

The battery frame 602 may incorporate several features to enhance the functionality, durability, and safety of the battery pack module 600. In some aspects, the battery frame 602 may be constructed from lightweight yet strong materials such as aluminum alloys or reinforced polymers to minimize overall weight while providing robust structural support. The frame may include integrated cooling channels or heat sinks to facilitate thermal management of the battery cells, potentially improving performance and longevity.

In some implementations, the battery frame 602 may feature a modular design with standardized dimensions, allowing for easy interchangeability between different vehicle models or applications. The frame may incorporate quick-release mechanisms or sliding rails to facilitate rapid removal and installation of the battery pack module 600.

The battery frame 602 may also include protective elements such as shock-absorbing materials or reinforced corners to safeguard the internal components from physical impacts or vibrations. In some cases, the frame may be designed with IP-rated seals to protect against dust and moisture ingress, enhancing the durability of the battery pack module 600 in various environmental conditions.

To improve maintenance accessibility, the battery frame 602 may feature removable panels or access ports, allowing technicians to inspect or service individual components without disassembling the entire module. The frame may also incorporate integrated handles or lifting points to facilitate safe handling during installation or removal.

In some aspects, the battery frame 602 may include built-in sensors for monitoring structural integrity, temperature, or vibration. These sensors may interface with the controller 608 to provide real-time data on the physical condition of the battery pack module 600.

In some implementations, each of the plurality of slave units 604 may function as individual battery cells or modules that are monitored and controlled by controller 608. These slave units may be arranged in series or parallel configurations to achieve the desired voltage and capacity for the overall battery pack.

The slave units 604 may incorporate sensors to measure various parameters such as voltage, current, temperature, and state of charge. This data may be communicated to the controller 608, which can use this information to optimize the performance and longevity of the battery pack module 600.

In some implementations, each slave unit 604 may have its own local management circuitry that can perform basic functions such as cell balancing and temperature regulation. This distributed approach may help to improve the overall efficiency and reliability of the battery management system.

The controller 608 may use the data from the slave units 604 to implement advanced algorithms for state of charge estimation, capacity prediction, and fault detection. This may allow for more accurate and reliable operation of the battery pack module 600, particularly in high-current applications such as aircraft towing vehicles.

In some cases, the slave units 604 may be designed to be individually replaceable, allowing for easier maintenance and repair of the battery pack module 600. This modular approach may also facilitate the upgrading of the battery system over time, as individual slave units 604 can be replaced with newer, more advanced versions as technology improves.

The communication between slave units 604 and the controller 608 may be implemented using various protocols, such as CAN bus or I2C, depending on the specific requirements of the application. This communication system may allow for real-time monitoring and control of each slave unit 604, enabling rapid response to changing conditions or potential issues.

The display 606 is positioned on the front face of the battery pack module 600, providing a visual interface for monitoring the status and performance of the battery pack module 600. The controller 608, located at one end of the battery pack module 600, is responsible for managing and controlling the operation of the battery pack module 600. The controller 608 may monitor the state of charge, voltage, current, and temperature of each battery cell, and may adjust the charging and discharging processes to optimize battery performance and lifespan.

In some embodiments, the controller 608 may include a central processing unit (CPU), memory, and software and/or firmware to manage the operation of the battery pack module 600. The CPU may be a microprocessor or microcontroller designed for embedded applications, capable of executing complex algorithms and managing multiple input/output operations simultaneously.

The memory may include both volatile and non-volatile components. Volatile memory, such as RAM, may be used for temporary data storage and rapid access during operation. Non-volatile memory, such as flash memory or EEPROM, may store the firmware, configuration settings, and historical data that need to persist when power is removed.

The software and/or firmware may be programmed to perform various functions related to battery management. These functions may include monitoring battery parameters, implementing charging and discharging algorithms, managing communication protocols, and executing safety protocols. The software may also include diagnostic routines to identify potential issues and optimize battery performance.

In some implementations, the controller 608 may utilize a real-time operating system (RTOS) to manage tasks and ensure timely response to critical events. The RTOS may allow for prioritization of tasks, such as giving immediate attention to safety-critical functions while managing less time-sensitive operations in the background.

The controller 608 may also include interfaces for external communication, such as CAN bus, Ethernet, or wireless protocols. These interfaces may allow the controller to communicate with other vehicle systems, charging stations, or remote monitoring systems.

The power relays 610, situated near the controller 608, facilitate power distribution and control within the battery pack module 600. In some aspects, the power relays 610 may be high-current DC power relays, capable of managing high current flows required for high-power applications such as aircraft towing.

In some implementations, the power relays 610 may function as high-current switches, controlling the flow of electricity between the battery pack module 600 and the external load or charging system. These relays may be designed to handle the high currents associated with aircraft towing and other demanding applications.

The power relays 610 may incorporate solid-state components or electromechanical mechanisms to achieve rapid switching capabilities. In some aspects, these relays may be capable of interrupting current flow within milliseconds, providing a fast response to protect the battery system from potential faults or overloads.

The controller 608 may manage the operation of the power relays 610, sending signals to open or close the relays based on various factors such as system load, battery state of charge, and safety parameters. This dynamic control may allow for efficient power management and load balancing across multiple battery modules if present.

In some cases, the power relays 610 may include built-in current sensing capabilities, providing real-time feedback to the controller 608 about the current flow through the system. This information may be used to optimize power distribution and detect any anomalies in current draw.

The power relays 610 may also serve as a safety mechanism, capable of quickly disconnecting the battery pack from the external system in case of emergencies or detected faults. This feature may help prevent damage to the battery pack or connected equipment in the event of short circuits, overheating, or other potentially hazardous conditions.

In some implementations, the power relays 610 may be designed with redundancy, incorporating multiple relay units in parallel. This configuration may enhance system reliability by providing backup switching capabilities in case of individual relay failure.

The power relays 610 may be thermally managed to handle the heat generated during high-current switching operations. This thermal management may include heat sinks, cooling fins, or even active cooling systems in some high-power applications.

The battery pack module 600 may also incorporate at least one supercapacitor, which can manage rapid changes in current flow, providing a buffer during high power demand or regenerative braking events.

In some aspects, the incorporation of supercapacitors in the battery pack module 600 may offer several advantages for high-current applications such as aircraft towing vehicles. Supercapacitors may provide rapid charge and discharge capabilities, allowing them to quickly absorb or release large amounts of energy. This characteristic may be particularly beneficial in managing sudden power demands or regenerative braking events, potentially reducing stress on the main battery cells and extending their lifespan.

The high power density of supercapacitors may complement the high energy density of lithium iron phosphate batteries, creating a hybrid energy storage system. This combination may allow for improved overall system performance, with supercapacitors handling short-term, high-power events while the main batteries provide sustained energy output.

In some implementations, supercapacitors may act as a buffer between the main battery pack and the load, smoothing out voltage fluctuations and reducing the peak current drawn from the batteries. This buffering effect may help to maintain a more stable voltage supply to the vehicle's systems, potentially improving the efficiency and reliability of electric components.

The fast charging capability of supercapacitors may also be advantageous in energy recovery systems. During regenerative braking or other energy recovery events, supercapacitors may quickly capture and store energy that might otherwise be lost, potentially improving the overall energy efficiency of the vehicle.

The long cycle life of supercapacitors, often exceeding that of traditional batteries, may contribute to the longevity of the overall energy storage system. This durability may be particularly beneficial in high-use applications like aircraft towing vehicles, where frequent charge-discharge cycles are common.

In some cases, the battery pack module 600 may also include one or more MOSFETs and/or IGBTs to regulate voltage and current levels. These components may be used to switch or amplify signals in the battery management system, potentially improving the efficiency and reliability of the system.

In some implementations, the battery pack module 600 may utilize Metal-Oxide-Semiconductor Field-Effect Transistors (MOSFETs) for voltage and current regulation. MOSFETs may function as voltage-controlled switches in the battery management system. The operation of a MOSFET may involve three terminals: the source, drain, and gate. When a voltage is applied to the gate terminal, it may create an electric field that forms a conductive channel between the source and drain terminals.

In some aspects, the conductive channel in a MOSFET may allow current to flow from the source to the drain when the gate voltage exceeds a certain threshold. The amount of current flow may be controlled by adjusting the gate voltage, allowing for precise regulation of power delivery within the battery pack module 600.

MOSFETs may offer several advantages in battery management applications. They may provide fast switching speeds, which can be beneficial for efficient power conversion and regulation. The low on-state resistance of MOSFETs may result in reduced power losses, potentially improving the overall efficiency of the battery system.

In some cases, the battery pack module 600 may employ different types of MOSFETs, such as N-channel or P-channel devices, depending on the specific requirements of the circuit. N-channel MOSFETs may be used for low-side switching, while P-channel MOSFETs may be suitable for high-side switching applications.

The controller 608 may manage the operation of the MOSFETs by sending control signals to their gate terminals. This may allow for dynamic adjustment of voltage and current levels based on the battery pack's state of charge, load demands, and other operational parameters.

In some implementations, the battery pack module 600 may utilize Insulated Gate Bipolar Transistors (IGBTs) for voltage and current regulation. IGBTs may combine the high input impedance and fast switching speeds of MOSFETs with the high current and low saturation voltage capabilities of bipolar junction transistors.

IGBTs may offer several advantages in high-power applications such as aircraft towing vehicles. They may handle higher voltage and current levels compared to MOSFETs, making them suitable for managing the high power demands of electric vehicle systems. The ability of IGBTs to operate at higher switching frequencies may allow for more efficient power conversion and smoother control of electric motors.

In some aspects, IGBTs may provide lower conduction losses at high current levels compared to MOSFETs. This characteristic may result in improved overall system efficiency, particularly in high-load situations common in aircraft towing operations. The reduced power dissipation may also contribute to better thermal management within the battery pack module 600.

IGBTs may offer robust short-circuit capability, potentially enhancing the reliability and safety of the battery management system. This feature may be particularly beneficial in demanding industrial applications where fault tolerance is crucial.

In some cases, the use of IGBTs may simplify circuit design due to their ability to be easily paralleled for higher current handling capacity. This scalability may allow for flexible power management solutions that can be adapted to various vehicle sizes and power requirements.

The controller 608 may manage the operation of the IGBTs by applying appropriate gate voltages, allowing for precise control of current flow within the battery pack module 600. This control may enable dynamic power management strategies, potentially optimizing the performance and efficiency of the electric towing vehicle under varying load conditions.

The battery pack module 600 is designed to be removable and replaceable, offering flexibility in capacity and power output to accommodate various operational needs. This modular design allows for easy scalability of the system, enabling users to adjust the power capacity by adding or removing battery pack modules as needed. This flexibility may accommodate various operational requirements and aircraft sizes without necessitating a complete system overhaul.

In some implementations, the battery pack module 600 is capable of providing a peak current output of at least 1000 amperes, making it suitable for high-power applications such as aircraft towing and ignition/startup operations. In some cases, the system is configured to provide a sustained current output of at least 1000 amperes for at least 3 minutes, ensuring sufficient power for demanding tasks. In other cases, the system is capable of providing a peak current output of at least 3000 amperes, further enhancing its high-power capabilities.

Referring to FIG. 6, in some embodiments, the battery frame 602 of the battery pack module 600 may also house a plurality of lead-gel batteries in addition to the LiFePO4 batteries. The lead-gel batteries may be arranged in rows within the battery frame 602, similar to the arrangement of the LiFePO4 batteries. The inclusion of lead-gel batteries may provide additional energy storage capacity and may offer certain advantages such as lower cost and established charging infrastructure.

In some cases, the lead-gel batteries and the LiFePO4 batteries may be electrically connected in a parallel or series configuration, depending on the desired voltage and current output of the battery pack module 600. The controller 608 may manage the charging and discharging processes of both types of batteries, ensuring optimal performance and longevity of the battery pack module 600.

The controller 608 may be configured to balance the charging and discharging of the lead-gel batteries and the LiFePO4 batteries. This balancing may involve adjusting the current flow to and from each type of battery based on their respective state of charge, voltage, temperature, and other parameters. The controller 608 may use data from the slave units 604 and other sensors to determine the optimal charging and discharging strategy for each type of battery.

In some aspects, the controller 608 may implement advanced algorithms for state of charge estimation, capacity prediction, and fault detection for both the lead-gel batteries and the LiFePO4 batteries. This may allow for more accurate and reliable operation of the battery pack module 600, particularly in high-current applications such as aircraft towing vehicles.

In some implementations, the controller 608 may also manage the power distribution between the lead-gel batteries and the LiFePO4 batteries during high-power demand events. For example, during a high-current towing operation, the controller 608 may draw more power from the LiFePO4 batteries, which are capable of delivering high currents, while maintaining the lead-gel batteries at a lower state of discharge to extend their lifespan.

In some cases, the controller 608 may also manage the power distribution between the lead-gel batteries and the LiFePO4 batteries during regenerative braking events. For example, during a regenerative braking event, the controller 608 may direct the recovered energy primarily to the LiFePO4 batteries, which can accept high charge currents, while limiting the charge current to the lead-gel batteries to prevent overcharging and extend their lifespan.

In some aspects, the controller 608 may also manage the power distribution between the lead-gel batteries and the LiFePO4 batteries during idle periods or low-power demand events. For example, during idle periods, the controller 608 may draw power primarily from the lead-gel batteries, which are more efficient at low discharge rates, while maintaining the LiFePO4 batteries at a higher state of charge for high-power demand events.

In some implementations, the controller 608 may also manage the power distribution between the lead-gel batteries and the LiFePO4 batteries based on the temperature conditions. For example, in cold conditions, the controller 608 may draw more power from the lead-gel batteries, which can operate effectively at lower temperatures, while limiting the discharge of the LiFePO4 batteries to prevent capacity loss due to low temperature.

In some aspects, the controller 608 may also manage the power distribution between the lead-gel batteries and the LiFePO4 batteries based on the load requirements of the tow vehicle. For example, during heavy towing operations, the controller 608 may draw more power from the LiFePO4 batteries, which can deliver high currents, while during light towing operations or idle periods, the controller 608 may draw more power from the lead-gel batteries, which are more efficient at low discharge rates.

In some cases, the controller 608 may also manage the power distribution between the lead-gel batteries and the LiFePO4 batteries based on the charging status of the batteries. For example, if the lead-gel batteries are fully charged while the LiFePO4 batteries are partially discharged, the controller 608 may draw more power from the lead-gel batteries until the state of charge of the two types of batteries is balanced.

Figure 7:
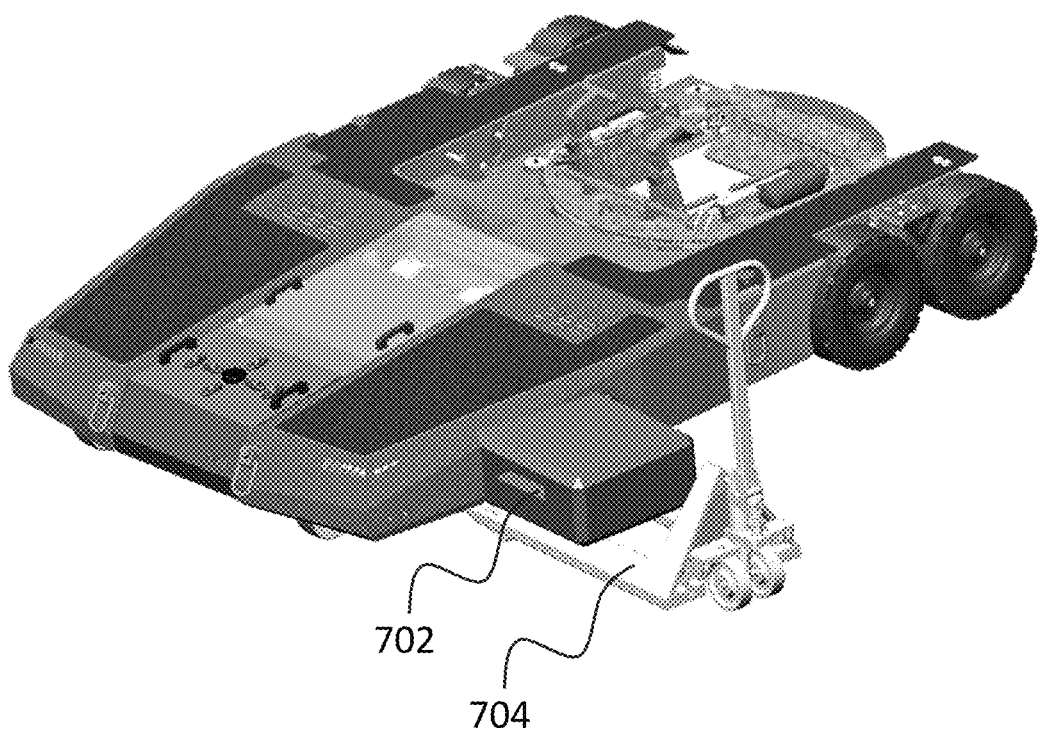
FIG. 7 illustrates an isometric view of a tow vehicle with a modular battery system, according to an embodiment of the disclosure.

Referring to FIG. 7, in some aspects, a tow vehicle 700 may be equipped with a modular battery system, which includes a removable battery pack 702. The tow vehicle 700 may be one of many possible applications of the modular high-current battery management system because it requires high breakaway currents to overcome the inertia of a stationary aircraft and initiate movement.

In some implementations, the modular high-current battery management system may be applied to ground power units (GPUs) used in aviation settings. GPUs may provide electrical power to aircraft when they are parked at the gate or in maintenance areas. The modular battery system may allow GPUs to operate without the need for a constant connection to the electrical grid, potentially increasing flexibility in aircraft servicing locations.

The system may also be utilized in ramp carts, which are mobile power units used to start aircraft engines, particularly in helicopters and smaller fixed-wing aircraft. In some aspects, the high current output capability of the modular battery system may be well-suited for providing the substantial power required for engine start-up procedures. The modular nature of the battery packs may allow for easy customization of power capacity based on the specific requirements of different aircraft types.

The system may also find applications in mobile maintenance equipment used in aviation settings. For example, it may power portable hydraulic test stands, avionics test equipment, or mobile lighting systems. In some implementations, the modular battery system may provide a portable, high-capacity power source that can be easily transported to different locations around an airport or maintenance facility.

The examples provided for applications of the modular high-current battery management system should not be considered as limiting the scope of the disclosure. Embodiments of the invention may be used in nearly limitless applications, particularly those with momentary high-current demands. The modular high-current battery management system may be adaptable to various industries and use cases beyond the aviation sector.

In some aspects, the system may find applications in the automotive industry, such as in electric vehicle fast-charging stations or in high-performance electric vehicles that require rapid acceleration. The system may also be utilized in renewable energy installations, where it could manage power fluctuations in solar or wind energy systems.

The modular battery system may be applicable in construction and mining equipment, where high-power demands are common. For instance, it may power electric excavators, haul trucks, or drilling equipment that require bursts of high current.

In some implementations, the system may be used in marine applications, such as powering electric boat motors or providing auxiliary power for large ships. The modular nature of the battery packs may allow for flexible installation in various vessel configurations.

The system may also find use in emergency and backup power applications. For example, it may provide rapid-response power for data centers, hospitals, or telecommunications infrastructure during grid outages.

In some cases, the modular high-current battery management system may be adapted for use in aerospace applications beyond ground support equipment. It may potentially power electric propulsion systems in small aircraft or provide auxiliary power in larger aircraft.

The system may also be applicable in industrial manufacturing settings, powering equipment such as electric furnaces, welding machines, or large-scale 3D printers that require high current inputs.

These examples illustrate the versatility of the modular high-current battery management system, but they should not be considered exhaustive. The system's adaptability and scalability may allow for its application in numerous other fields and use cases where high-current, reliable power management is required.

Referring back to FIG. 7, the battery pack 702 is shown positioned on one side of the tow vehicle 700, integrated into the vehicle's structure. In some embodiments, additional battery pack modules may be installed on the other side of the tow vehicle 700, providing increased power capacity. The battery pack modules are designed to be removable and replaceable, allowing for quick battery swapping to sustain continuous operations.

In some implementations, the tow vehicle 700 can be autonomous or semi-autonomous. In such cases, the tow vehicle 700 may be configured to return to a home charging station when battery levels are low, or on a preconfigured schedule, to improve the efficiency of charging a fleet of vehicles.

In some implementations, the autonomous or semi-autonomous tow vehicle 700 may be equipped with systems that enable it to autonomously connect with a charging station. The tow vehicle 700 may utilize a sensor fusion system, navigation system, and communication protocols to locate and approach a compatible charging station.

The tow vehicle 700 may be equipped with GPS and inertial navigation systems that allow it to determine its position relative to known charging station locations. In some aspects, the vehicle may also use computer vision systems, such as cameras, optical sensors, and LiDAR sensors, to detect and recognize charging stations in its vicinity. These sensors may help the vehicle navigate precisely to the charging location, avoiding obstacles and other vehicles in the process.

Once in proximity to the charging station, the tow vehicle 700 may employ short-range communication technologies such as Wi-Fi, Bluetooth, or dedicated short-range communications to establish a connection with the charging station. This communication link may allow the vehicle and charging station to exchange information about charging requirements, availability, and positioning.

In some implementations, the tow vehicle 700 may be configured to extend or receive a charging port to connect with the charging station's power supply. This system may use sensors and actuators to align and engage with the charging interface precisely. Alternatively, the vehicle may be designed to position itself over an inductive charging pad embedded in the ground, allowing for contactless power transfer.

The tow vehicle 700 may also be compatible with robotic charging systems employed to automate the process of battery pack exchange for the tow vehicle 700. These systems may be designed to remove one or more depleted battery packs from the tow vehicle, transport them to a charging station, and replace them with fully charged battery packs.

In some implementations, the robotic charging system may include one or more robotic mobile transport vehicles that move on wheels or tracks. These mobile robots may be designed to navigate autonomously within the charging facility, transporting battery packs between the tow vehicles and charging stations. The use of wheeled or tracked robots may provide flexibility in terms of movement and the ability to navigate various terrains or floor surfaces within the charging area. These mobile robots may have one or more robotic arms for manipulating battery packs.

Alternatively, the robotic charging system may incorporate one or more robotic arms affixed to a larger assembly, similar to those used on an automotive assembly line. These robotic arms may be mounted on a fixed base or on a movable platform, allowing them to reach multiple tow vehicles or charging stations within their operational range. The robotic arms may be equipped with specialized end effectors designed to securely grasp and manipulate the battery packs during the exchange process.

In some aspects, the robotic charging system may utilize a combination of mobile transport vehicles and fixed robotic arms. For example, mobile robots may transport battery packs over longer distances within the facility, while fixed robotic arms perform the precise insertion and removal of battery packs from the tow vehicles and charging stations. This hybrid approach may optimize the efficiency of the battery exchange process by combining the flexibility of mobile robots with the precision of fixed robotic arms.

The robotic arms or manipulators (on a mobile robot or as part of a larger assembly) may be equipped with specialized end effectors designed to interface with the battery pack 702. These end effectors may be configured to securely grasp and release the battery pack, as well as to engage and disengage any locking mechanisms or electrical connections.

In some aspects, the tow vehicle 700 may be equipped with a standardized interface for the battery pack 702, allowing the robotic system to easily locate and access the pack. This interface may include guide rails, alignment pins, or other features to facilitate precise positioning of the robotic arm during the removal and insertion process.

Once aligned, the robotic arm may engage with the battery pack 702, disconnecting any electrical connections and releasing any locking mechanisms. The arm may then carefully extract the battery pack from the tow vehicle 700.

Figure 8:
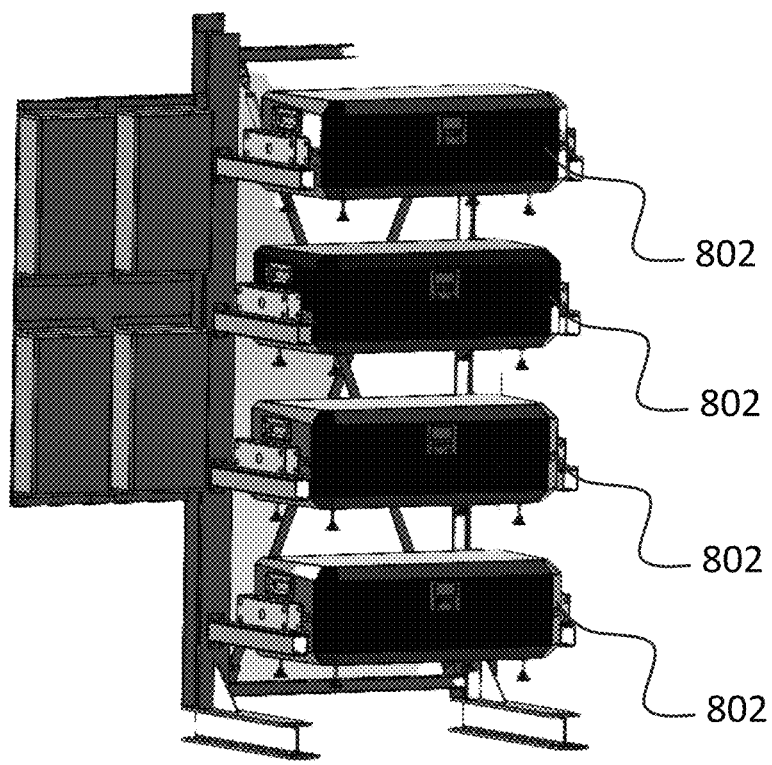
FIG. 8 illustrates a perspective view of a charging station for battery packs, in accordance with example embodiments.

After removing the depleted battery pack, the robotic system may transport it to a designated charging station (e.g., charging station 800 in FIG. 8). The charging station may be equipped with multiple charging bays, each designed to accommodate a battery pack 802. The at least one robotic arm may insert the depleted pack into an available charging bay, ensuring proper alignment and connection for charging.

Simultaneously, the robotic system may retrieve a fully charged battery pack 802 from another bay in the charging station 800. This charged pack may then be transported back to the tow vehicle 700 and inserted into the vacant battery compartment. The robotic arm may use its precision control and sensing capabilities to ensure proper alignment and engagement of the battery pack with the vehicle's electrical and mechanical interfaces.

The entire battery exchange process may be monitored and controlled by a central management system, which may coordinate the actions of the robots and robotic arms, manage the charging station, and communicate with the tow vehicle 700. This system may optimize the battery exchange process based on factors such as vehicle schedules, battery charge levels, and overall fleet energy demands.

In some cases, the robotic charging system may be integrated with the autonomous navigation capabilities of the tow vehicle 700. The vehicle may be programmed to autonomously position itself in a specific location and orientation to facilitate the robotic battery exchange process, further streamlining the operation.

The use of robotic charging systems for automated battery pack exchange may significantly reduce downtime for the tow vehicle 700, potentially allowing for near-continuous operation. This approach may be particularly beneficial in high-demand environments such as busy airports, where minimizing vehicle downtime is crucial for efficient operations.

In some aspects, the tow vehicle 700 may be designed to work with multiple charging technologies. For example, it may be capable of connecting to traditional conductive chargers, positioning itself over inductive charging pads, or aligning with high-power wireless charging systems that use resonant inductive coupling for efficient power transfer over short distances.

The autonomous charging capability may be integrated with the vehicle's overall fleet management system. This integration may allow for optimized scheduling of charging sessions based on factors such as current battery levels, upcoming tasks, and overall fleet energy demands. The system may also be capable of queuing vehicles for charging and managing the charging process to ensure efficient use of available charging infrastructure.

In non-automated embodiments, each battery pack module 702 can be removed and replaced using a hand-operated lift truck 704. This allows for quick and easy battery swapping, minimizing downtime and enabling continuous operation of the tow vehicle 700. The lift truck 704 is positioned to facilitate the removal or installation of the battery pack 702. It features a lifting mechanism with forks designed to engage with the battery pack 702.

Referring to FIG. 8, in some embodiments, the charging station 800 comprises a vertical frame structure with multiple charging bays arranged vertically. Each charging bay is designed to accommodate a battery pack 802. The charging station 800 can simultaneously charge multiple battery packs 802, with four battery packs 802 shown in the figure.

The frame of the charging station 800 may be constructed with a sturdy material, likely metal, to support the weight of multiple battery packs 802. The frame includes horizontal support platforms for each battery pack 802. These platforms appear to have guide rails or alignment features to ensure proper positioning of the battery packs 802 during charging.

In some aspects, the charging station 800 may be designed to accommodate all of the battery packs 802 at a height no higher than the maximum lifting height of a hand-operated lift truck. This design feature may facilitate efficient swapping operations, allowing for quick and easy replacement of depleted battery packs with fully charged ones.

In some cases, the charging station 800 may be equipped with automated systems for managing the charging process. These systems may include sensors for monitoring battery status, controllers for managing charging cycles, and communication interfaces for reporting charging status to a central management system.

A number of implementations have been described. Nevertheless, it will be understood that various modifications may be made without departing from the spirit and scope of the disclosure. Accordingly, other implementations are within the scope of the following claims.

The invention claimed is:

1. A sensor system for an aircraft tow vehicle, the sensor system comprising:
   a plurality of sensors; and
   a controller configured to:
      receive data from the plurality of sensors,
      process the data to detect an aircraft's nose landing gear,
      automatically control a turntable lifting unit of the aircraft tow vehicle to maintain the aircraft's nose landing gear in a straight position relative to a roll axis of the aircraft during a towing or pushback operation,
      process the data to detect a first line marking in an environment of the aircraft tow vehicle,
      detect an intersection of the first line marking with another line marking indicating a turn, receive input indicating a turn direction, and
      automatically rotate the aircraft in place based on the detected intersection and the indicated turn direction;
      wherein the plurality of sensors comprises at least one of a camera sensor, an ultrasonic sensor, a radar sensor, or a laser sensor.

2. The sensor system of claim 1, wherein one of the one or more line markings, objects, and symbols is a line marking; and wherein the controller is further configured to:
   process the data to determine a position of the aircraft's nose landing gear relative to the line marking, and
   control the turntable lifting unit while automatically adjusting a position of the aircraft tow vehicle relative to the aircraft's nose landing gear during a towing or pushback operation to maintain alignment of the aircraft with the line marking.

3. The sensor system of claim 1, wherein the controller is further configured to instruct the turntable lifting unit to automatically release the aircraft from the aircraft tow vehicle upon completion of a towing or pushback operation.

4. The sensor system of claim 1, wherein the controller is further configured to interface with a digital twin of an operating environment of the aircraft tow vehicle, and wherein the controller is configured to use information from the digital twin to assist in navigation and decision-making during towing operations.

5. The sensor system of claim 1, wherein the controller is further configured to process the data to detect human gestures, process the detected human gestures to determine corresponding instructions, and automatically control the aircraft tow vehicle in response to the determined instructions.

6. The sensor system of claim 1, wherein the controller is configured to autonomously navigate the aircraft tow vehicle to the aircraft, perform a towing or pushback operation, and return to a designated location after completion of the towing or pushback operation without human intervention.

7. The sensor system of claim 1, wherein the controller is further configured to:
  process the data to detect an obstacle in a path of the aircraft tow vehicle;
  automatically adjust at least one of the path and speed of the aircraft tow vehicle in response to the detected obstacle.

8. The sensor system of claim 1, wherein the controller is further configured to:
  receive real-time routing information from an airport traffic management system; and
  adjust a path of the aircraft tow vehicle based on the received real-time routing information.

9. The sensor system of claim 1, wherein the controller is further configured to:
  receive data from one or more external sensor systems located in an operating environment of the aircraft tow vehicle;
  integrate the received data from the one or more external sensor systems with the data received from the plurality of sensors; and
  use the integrated data to enhance navigation and decision-making during towing or pushback operations.

10. A method for controlling an aircraft tow vehicle, the method comprising:
  receiving, by a controller, data from a plurality of sensors;
  processing, by the controller, the data to detect an aircraft's nose landing gear;
  automatically controlling, by the controller, a turntable lifting unit of the aircraft tow vehicle to maintain the aircraft's nose landing gear in a straight position relative to a roll axis of the aircraft during a towing or pushback operation;
  processing, by the controller, the data to detect a first line marking in an environment of the aircraft tow vehicle;
  detecting, by the controller, an intersection of the first line marking with another line indicating a turn;
  receiving, by the controller, input indicating a turn direction; and
  automatically rotating, by the controller, the aircraft in place based on the detected intersection and the indicated turn direction;

wherein the plurality of sensors comprises at least one of a camera sensor, an ultrasonic sensor, a radar sensor, or a laser sensor.

11. The method of claim 10, wherein one of the one or more line markings, objects, and symbols is a line marking, and the method further comprises:
  processing, by the controller, the data to determine a position of the aircraft's nose landing gear relative to the line marking; and
  controlling, by the controller, the turntable lifting unit while automatically adjusting a position of the aircraft tow vehicle relative to the aircraft's nose landing gear during a towing or pushback operation to maintain alignment of the aircraft with the line marking.

12. The method of claim 10, further comprising:
automatically instructing, by the controller, the turntable lifting unit to release the aircraft from the aircraft tow vehicle upon completion of a towing or pushback operation.

13. The method of claim 10, further comprising:
interfacing, by the controller, with a digital twin of an operating environment of the aircraft tow vehicle; and
using, by the controller, information from the digital twin to assist in navigation and decision-making during towing operations.

14. The method of claim 10, further comprising:
processing, by the controller, the data to detect human gestures;
processing, by the controller, the detected human gestures to determine corresponding instructions; and
automatically controlling, by the controller, the aircraft tow vehicle in response to the determined instructions.

15. The method of claim 10, further comprising:
autonomously navigating, by the controller, the aircraft tow vehicle to the aircraft;
performing, by the controller, a towing or pushback operation; and
returning, by the controller, to a designated location after completion of the towing or pushback operation without human intervention.

16. The method of claim 10, further comprising:
processing, by the controller, the data to detect an obstacle in a path of the aircraft tow vehicle; and
automatically adjusting, by the controller, at least one of the path and speed of the aircraft tow vehicle in response to the detected obstacle.

17. The method of claim 10, further comprising:
receiving, by the controller, real-time routing information from an airport traffic management system; and
adjusting, by the controller, a path of the aircraft tow vehicle based on the received real-time routing information.

18. The method of claim 10, further comprising:
receiving, by the controller, data from one or more external sensor systems located in an operating environment of the aircraft tow vehicle;
integrating, by the controller, the received data from the one or more external sensor systems with the data received from the plurality of sensors; and
using, by the controller, the integrated data to enhance navigation and decision-making during towing or pushback operations.

* * * * *